United States Patent
Zhao et al.

(10) Patent No.: US 11,086,036 B2
(45) Date of Patent: Aug. 10, 2021

(54) AVO IMAGING CONDITION IN ELASTIC REVERSE TIME MIGRATION

(71) Applicant: Saudi Arabian Oil Company, Dhahran (SA)

(72) Inventors: Yang Zhao, Katy, TX (US); Houzhu Zhang, Houston, TX (US); Hongwei Liu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 351 days.

(21) Appl. No.: 16/254,227

(22) Filed: Jan. 22, 2019

(65) Prior Publication Data

US 2020/0233112 A1    Jul. 23, 2020

(51) Int. Cl.
*G01V 1/30* (2006.01)
*G01V 1/36* (2006.01)

(52) U.S. Cl.
CPC .............. *G01V 1/307* (2013.01); *G01V 1/362* (2013.01); *G01V 2210/512* (2013.01); *G01V 2210/632* (2013.01)

(58) Field of Classification Search
CPC ........ G01V 1/307; G01V 1/362; G01V 1/382; G01V 2210/632; G01V 2210/512
See application file for complete search history.

(56) References Cited

U.S. PATENT DOCUMENTS

| | | | |
|---|---|---|---|
| 9,798,026 B2 | 10/2017 | Ha et al. | |
| 2014/0293744 A1* | 10/2014 | Zhang | G01V 1/282 367/53 |
| 2015/0027695 A1 | 1/2015 | Mitchell et al. | |
| 2016/0097870 A1 | 4/2016 | Routh et al. | |
| 2016/0282490 A1 | 9/2016 | Qin et al. | |

(Continued)

FOREIGN PATENT DOCUMENTS

CN        105807315        7/2016

(Continued)

OTHER PUBLICATIONS

International Search Report and Written Opinion issued in International Application No. PCT/US2020/014006 dated May 4, 2020, 14 pages.

(Continued)

*Primary Examiner* — Bryan Bui
(74) *Attorney, Agent, or Firm* — Fish & Richardson P.C.

(57) ABSTRACT

In a general implementation, systems, apparatus, and methods for AVO of imaging condition in ERTM include the described system provides for an efficient and accurate vector wavefield decomposition with a corresponding modified dot-product imaging condition of ERTM by employing a modified AVO algorithm. In some implementations, the phases of source wavelet and multicomponent records are modified using a $1/\omega^2$ filter and the amplitudes of the extrapolated wavefields are scaled using $\alpha^2$ and $\beta^2$, where $\omega$, $\alpha$ and $\beta$ are the angular frequency, local P- and S-wave velocities, respectively. The results yield correct phases, amplitudes, and physical units for separated P- and S-mode wavefields. Divergence and curl operators may then be applied to the phase-corrected and amplitude-scaled elastic wavefields to extract vector P- and S-wavefields. With the separated vector wavefields, a modified dot-product imaging condition can be employed to produce PP and PS reflectivity images.

15 Claims, 14 Drawing Sheets

(56) References Cited

U.S. PATENT DOCUMENTS

| | | | |
|---|---|---|---|
| 2016/0320506 A1 | 11/2016 | Almuhaidib | |
| 2016/0334527 A1 | 11/2016 | Xu et al. | |
| 2017/0192118 A1 | 7/2017 | Du et al. | |
| 2019/0179047 A1* | 6/2019 | Kim | G01V 1/306 |
| 2020/0081146 A1* | 3/2020 | Sun | G01V 1/38 |

OTHER PUBLICATIONS

Yang et al., "Isotropic elastic reverse time migration using the phase-and amplitude-corrected vector P- and S-wavefields," Geophysics, vol. 83, No. 6, Nov. 1, 2018, 15 pages.

Cadwell, "Marine multicomponent seismology," The Leading Edge, vol. 18, Issue 11, Nov. 1999, 5 pages.

Du et al., "Polarity reversal correction for elastic reverse time migration," Geophysics vol. 77, Issue 2, Mar. 2012, 12 pages.

Du et al., "Vector-based elastic reverse time migration based on scalar imaging condition," Geophysics, vol. 82, Issue 2, Mar. 2017, 17 pages.

Duan and Sava, "Scalar imaging condition for elastic reverse time migration," Geophysics vol. 80, Issue 4, Jul. 2015, 10 pages.

Fomel, "Shaping regularization in geophysical-estimation problems," Geophysics vol. 72, No. 2, Mar. 2007, 8 pages.

Fuka, "Poisfft—a free parallel fast poisson solver," Applied Mathematics and Computation, vol. 267, Sep. 2014, 16 pages.

Granli et al., "Imaging through gas-filled sediments using marine shear-wave data," Geophysics vol. 64, No. 3, May-Jun. 1999, 10 pages.

Hokstad, "Multicomponent kirchhoff migration," Geophysics vol. 65, Issue 3, May 2000, 14 pages.

Jianming et al., "Application of converted-wave 3D/3-C data for fracture detection in a deep tight-gas reservoir," The Leading Edge, vol. 28, Issue 7, Jul. 2009, 11 pages.

Jainlei et al., "P- and S-wave-separated elas-tic wave-equation numerical modeling using 2D staggered grid," SEG Technical Program Expanded Abstracts, vol. 26, Issue 1, Jan. 2007.

Keho and Wu, "Elastic kirchhoff migration for vertical seismic profiles," SEG Technical Program Expanded Abstracts, presented at the 1987 SEG Annual Meeting, Oct. 11-15, 1987, 3 pages.

Kuo and Dai, "Kirchhoff elastic wave migration for the case of noncoincident source and receiver," Geophysics vol. 49, Issue 8, Aug. 1984, 16 pages.

Nguyen and McMechan, "Excitation amplitude imaging condition for prestack reverse-time migration," Geophysics vol. 78, No. 1, S37-S46, Dec. 2012, 10 pages.

Nguyen and McMechan, "Five ways to avoid storing source wavefield snapshots in 2d elastic prestack reverse time migration," Geophysics vol. 80, No. 1, S1-S18, Jan. 2015, 18 pages.

Popov, "A new method of computation of wave fields using gaussian beams," Wave Motion, vol. 4, Issue 1, Jan. 1982, 14 pages.

Rosales et al., "Wave-equation angle-domain common-image gathers for converted waves," Geophysics vol. 73, Issue 1, Jan. 2008, 10 pages.

Stewart et al., "Converted-wave seismic exploration: Applications," Geophysics vol. 68, Issue 1, Jan. 2003, 23 pages.

Sun and McMechan, "Scalar reverse-time depth migration of prestack elastic seismic data," Geophysics vol. 66, Issue 5, Sep. 2001, 9 pages.

Sun et al., "Prestack scalar reverse-time depth migration of 3d elastic seismic data," Geophysics vol. 71, Issue 5, S199-S207, Sep. 2006, 9 pages.

Tang and McMechan, "Multidirectional slowness vector for computing angle gathers from reverse time migration," Geophysics vol. 81, Issue 2, S55-S68, Mar. 2016, 14 pages.

Virieau, "P-SV wave propagation in heterogeneous media: Velocity-stress finite-difference method," Geophysics vol. 51, No. 4, Apr. 1986, 13 pages.

Wang and McMechan, "Vector-based elastic reverse time migration," Geophysics vol. 80, Issue 6, S245-S258, Nov. 2015, 15 pages.

Wang et al., "P- and S-decomposition in anisotropic media with localized low-rank approximations," Geophysics vol. 83, No. 1, C13-C26, Sep. 2017, 15 pages.

Wang et al., "Scalar and vector imaging based on wave mode de-coupling for elastic reverse time migration in isotropic and transversely isotropic media," Geophysics vol. 81, No. 5, Sep. 2016, 16 pages.

Xiao and Leaney, "Local vertical seismic profiling (VSP) elastic reverse-time migra-tion and migration resolution: Salt-flank imaging with transmitted P-to-S waves," Geophysics vol. 75, No. 2, S-35-S49, Mar. 2010, 15 pages.

Xue and McMechan, "Prestack elastic kirchhoff migration for multicomponent seismic data in variable velocity media," SEG Technical Program Expanded Abstracts, Jan. 1999, 5 pages.

Yan and Sava, "Improving the efficiency of elastic wave-mode separation for heterogeneous tilted transverse isotropic media," Geophysics vol. 76, No. 4, T65-T78, Jul.-Aug. 2011, 14 pages.

Yan and Sava, "Isotropic angle-domain elastic reverse-time migration," Geophysics vol. 73, No. 6, Nov.-Dec. 2008, 11 pages.

Yan and Xie, "An angle-domain imaging condition for elastic reverse time migration and its application to angle gather extraction," Geophysics vol. 77, No. 5, S105-S115, Sep.-Oct. 2012, 11 pages.

Yang et al., "2D isotropic elastic Gaussian beam migration for common-shot multicomponent records," Geophysics vol. 83, Issue 2, Nov. 2017, 15 pages.

Yang et al., "An amplitude-preserved adaptive focused beam seismic migration method," Petroleum Science, vol. 12, Issue 3, Aug. 2015, 11 pages.

Yang et al., "Common-shot elastic Gaussian beam depth migration," SEG-2015-5761273, SEG Technical Program Expanded Abstracts, Oct. 18-23, 2015, 6 pages.

Zhang and McMechan, "2d and 3d elastic wavefield vector decomposition in the wavenumber domain for vti media," Geophysics vol. 75, Issue 3, D13-D26, May 2010, 14 pages.

Zhang and Sun, "Practical issues in reverse time migration: true amplitude gathers, noise removal and harmonic source encoding," First Break, vol. 26, Jan. 2009, 7 pages.

Zhao and Li, "Model-based raditation pattern correction for interferometric redatuming in 4D seismic," Geophysics vol. 83, No. 4, Jul.-Aug. 2018, 11 pages.

Zhao and Li, "Wavelet-crosscorrelation-based interferometric redatuming in 4D seismic," Geophyics, vol. 83, No. 4, Jul.-Aug. 2018, 11 pages.

Zhao et al., "Target-oriented diversity stacking for virtual-source imaging and monitoring," The Leading Edge, vol. 37, Oct. 2018, 8 pages.

* cited by examiner

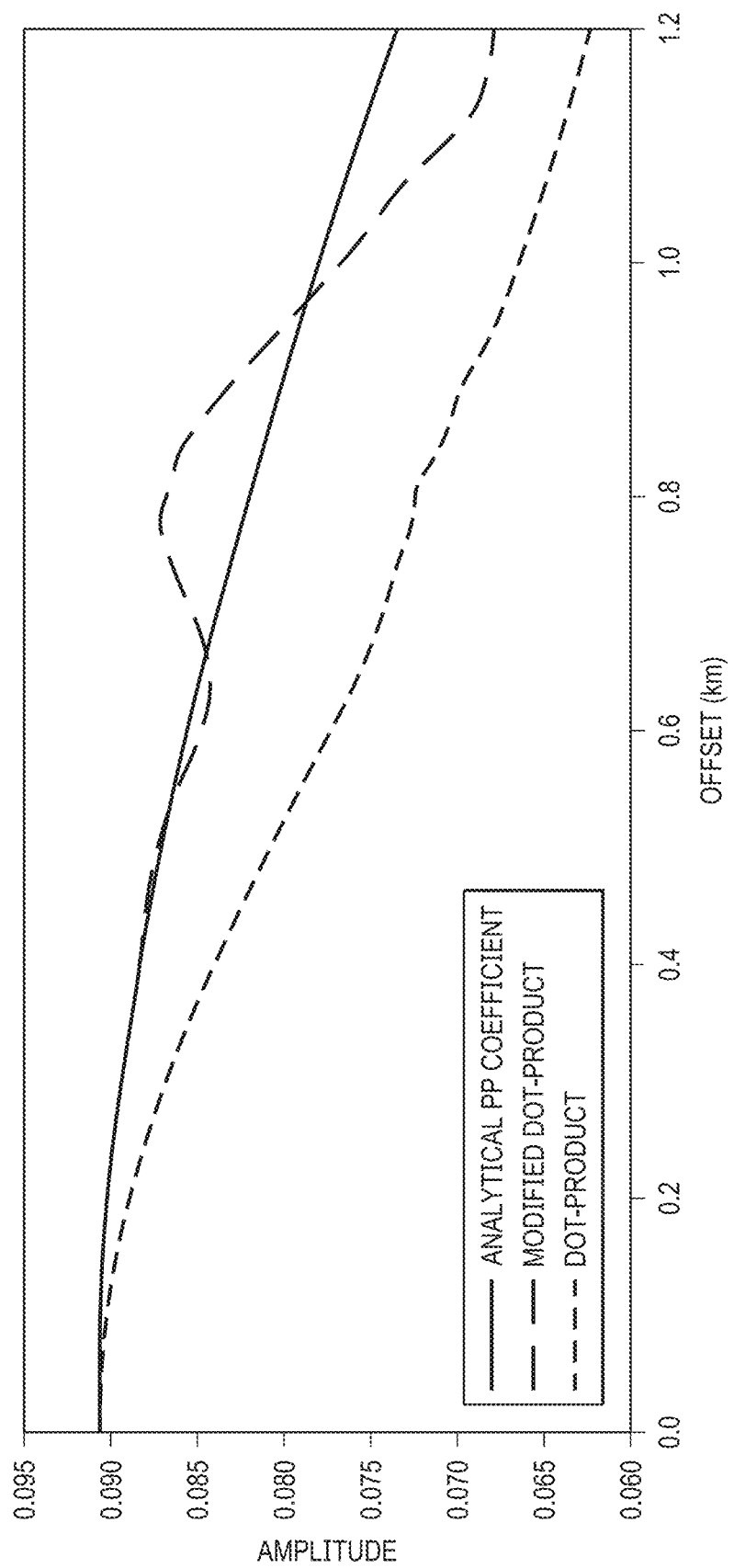

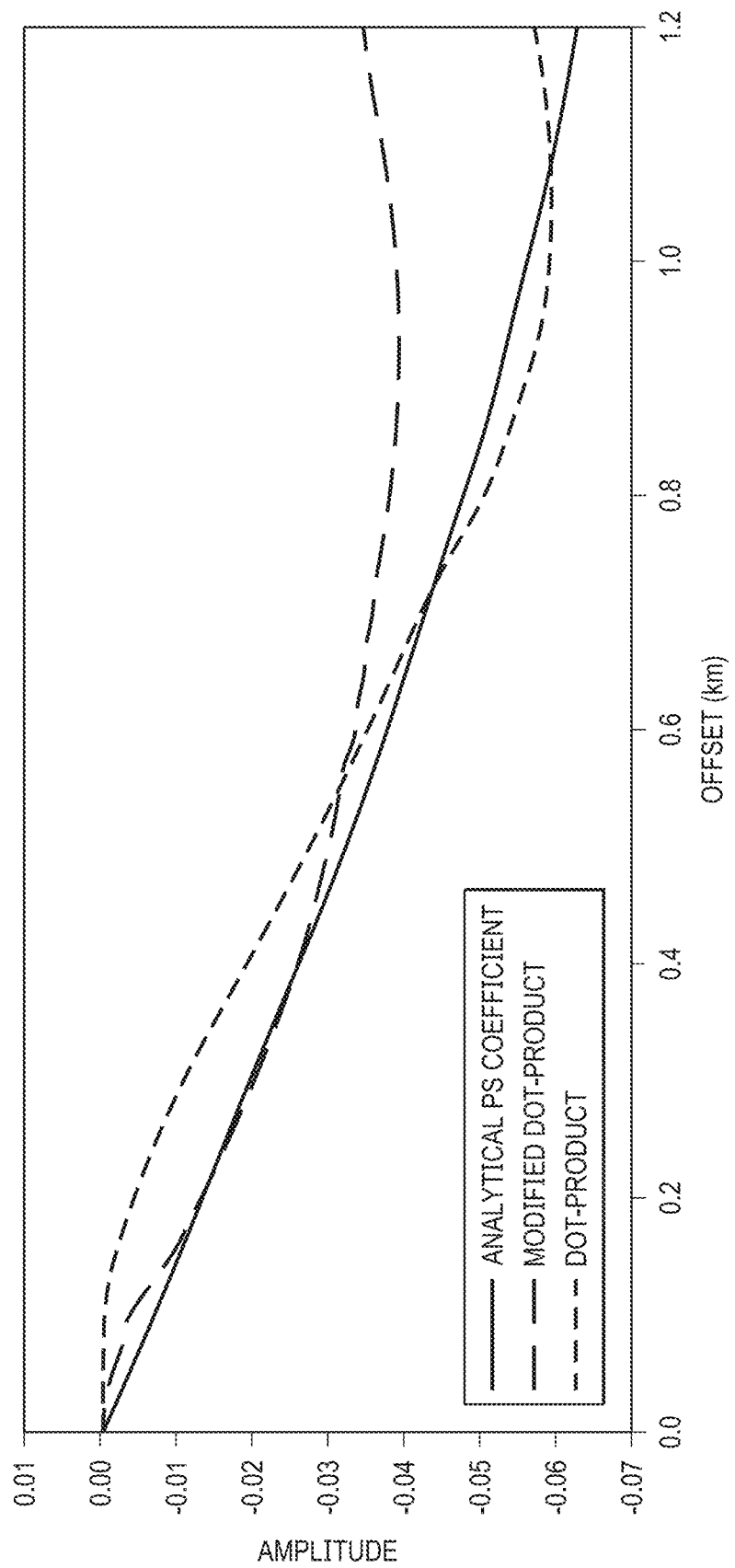

AVO IMAGING CONDITION IN ELASTIC REVERSE TIME MIGRATION

TECHNICAL FIELD

This disclosure relates to methods, systems, and apparatus for improving the exploration for hydrocarbons.

BACKGROUND

In the exploration for reservoirs of hydrocarbons, a bed includes a subdivision of the classification of a sequence of rocks and typically has similar lithographic features that separated from other groupings by recognizable boundaries. Moreover, the lithology of a rock unit includes a description of its physical characteristics visible at outcrop, in hand or core samples or with optical magnification microscopy, such as colour, texture, grain size, or composition. As such, the identification of a bed's lithology is an important aspect of reservoir characterization because the physical and chemical properties of the rock that holds hydrocarbons or water affect the response of every tool used to measure formation properties. To make accurate petrophysical calculations of porosity, water saturation, and permeability, the various lithologies of the reservoir interval are identified.

SUMMARY

Implementations of the present disclosure are generally directed to a system for detecting hydrocarbon by extrapolating source and receiver wave-fields in combination with an imaging condition to generate depth images of subsurface impedance contrasts for both primary and converted seismic phases. The described system provides for an efficient and accurate vector wavefield decomposition with a corresponding modified dot-product imaging condition of elastic reverse time migration (ERTM) by employing a modified amplitude variations with offset (AVO) algorithm.

In a general implementation, systems, apparatus, and methods for AVO of imaging condition in ERTM include the described system provides for an efficient and accurate vector wavefield decomposition with a corresponding modified dot-product imaging condition of ERTM by employing a modified AVO algorithm. In some implementations, the phases of source wavelet and multicomponent records are modified using a $1/\omega^2$ filter and the amplitudes of the extrapolated wavefields are scaled using $\alpha 2$ and $\beta 2$, where $\omega$, $\alpha$ and $\beta$ are the angular frequency, local compression wave (P-wave) and shear wave (S-wave) velocities, respectively. The results yield correct phases, amplitudes, and physical units for separated P- and S-mode wavefields. Divergence and curl operators may then be applied to the phase-corrected and amplitude-scaled elastic wavefields to extract vector P- and S-wavefields. With the separated vector wavefields, a modified dot-product imaging condition can be employed to produce PP and PS reflectivity images, where PP denotes reflection of the P-wave and PS denotes reflection of the S-wave. PP reflectivities includes a P-wave source-side wavefield as well as receiver-side. PS reflectivities includes a S-wave source-side wavefield as well as receiver-side.

Particular implementations of the subject matter described in this disclosure can be implemented so as to realize one or more of the following advantages. The described system can provide an accurate separated P- and S-wave from the elastic wave field (both amplitude and phase). In these instances, the produced seismic images have better quality when compared with other approaches.

It is appreciated that methods in accordance with the present disclosure can include any combination of the aspects and features described in this disclosure. That is, methods in accordance with the present disclosure are not limited to the combinations of aspects and features specifically described in this disclosure, but also may include any combination of the aspects and features provided.

The details of one or more implementations of the present disclosure are set forth in the accompanying drawings and the description that follows. Other features and advantages of the present disclosure will be apparent from the description and drawings, and from the claims.

BRIEF DESCRIPTION OF DRAWINGS

FIGS. 6A-6B depict a comparisons of the PP and PS reflection coefficients between the analytic solutions and the peak amplitudes of ERTM images.

DETAILED DESCRIPTION

Figure 1A:
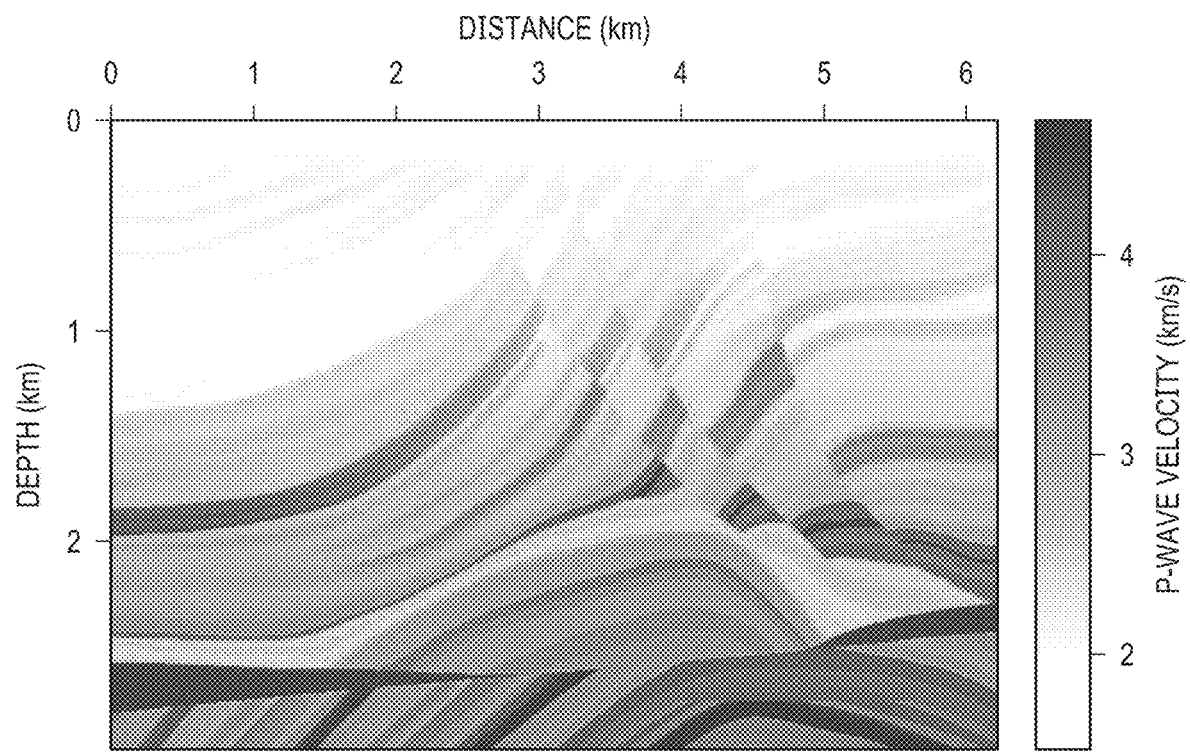
FIGS. 1A-1D depict the results of the ERTM experiment for an example Marmousi model generated according implementations of the present disclosure.

This disclosure generally describes a system that employs an efficient and accurate vector wavefield decomposition approach and corresponding imaging condition of elastic reverse time migration (ERTM). The described system may be employed for estimating lithology information and imaging complicated structures, such as XYZ, to detect hydrocarbons and reduce drilling risk. The disclosure is presented to enable any person skilled in the art to make and use the disclosed subject matter in the context of one or more particular implementations. Various modifications to the disclosed implementations will be readily apparent to those skilled in the art, and the general principles defined in this application may be applied to other implementations and applications without departing from scope of the disclosure. Thus, the present disclosure is not intended to be limited to the described or illustrated implementations, but is to be accorded the widest scope consistent with the principles and features disclosed in this application.

Amplitude variations with offset (AVO) has been a prominent technique in detecting hydrocarbons. In AVO analysis, practices may focus on looking for more sensitive indicator of hydrocarbon and extracting and exploiting anomalous variations between seismic and these sensitive parameters.

Least square regression analysis and inversion are the common approaches in the AVO analysis. AVO can detect hydrocarbons because AVO shows the variation of the amplitude of the offset, which represents the amplitude of the wave energy as it passes through the layer which is influenced by the parameters of the speed and density of the coating, so that the density of the layer can be analyzed by analyzing the reflection coefficient. AVO means that amplitude change with offset caused by lithology of fluid.

Moreover, formulations of finite-difference solutions to the elastic wave-equation can be employed to model elastic wave propagation within a medium on a discrete grid. Elastic wave propagation modelling makes possible the ability to extrapolate vector wave-fields forwards and backwards through time. One application of such modeling is a depth imaging technique known as reverse time migration (RTM). ERTM extrapolates source and receiver wave-fields in combination with an imaging condition to generate depth images of subsurface impedance contrasts for both primary and converted seismic phases.

Using both compressional (P) and shear (S) waves, ERTM can be useful for estimating lithology information, such as colour, texture, grain size, or composition, as well as the imaging of certain complicated structures, such as salt domes, shale bodies or faults, in comparison with, for example, acoustic approaches. For instance, converted shear-waves allow may be employed to resolve the structures and sedimentary targets in the gas chimney zone of a Tommeliten field much more accurately than by using compression waves. Moreover, interpreting both P- and S-wave images shows great potential to, for example, detect hydrocarbons in unconventional tight-sandstone reservoirs.

Early attempts of elastic imaging were performed in the framework of Kirchhoff migration. This approach projects P- and S-mode reflections to subsurface along traveltime trajectories. Since it is hard for ray theory to consider multiple arrivals and compute amplitudes in caustic zones, elastic Kirchhoff migration is inaccurate and even fails to resolve complicated structures where multipathing and caustic phenomena occur. Moreover, unlike classical ray theory, Gaussian beams compute local P- and S-wavefronts around central rays by solving both kinematic and dynamic ray tracing systems. In general, Gaussian beam migration is a wavefield continuation method operating on common-offset, common-azimuth data volumes. The wavefield continuation itself can provide a kinematically correct imaging condition. The migration is similar to Kirchhoff migration, but applied to local slant stacks using complex-valued traveltimes and amplitudes. These latter complex quantities come from expressing the wavefield as a sum of Gaussian beams, which are finite-frequency, ray-theoretical approximate solutions to the wave equation. In some cases, this enables elastic Gaussian beam migration to image complicated structures with good robustness and efficiency. However, due to the dependence on ray tracing to construct central rays, Gaussian beam method may be inaccurate for models with strong velocity variations.

In contrast, ERTM directly solves the elastic wave-equation using multicomponent records as boundary conditions. As such, ERTM can be employed to reconstruct forward and backward vector wavefields in a subsurface to produce accurate PP and PS reflectivities by applying proper imaging conditions. In general, when seismic images are generated, they are typically the zero-lag cross-correlation between the source-side wavefield and receiver-side wavefield. PP reflectivities includes a P-wave source-side wavefield as well as receiver-side. The PS stands for the P-wave source-side wavefield and S-wave receiver-side wavefields. An important step in ERTM is to extract compressional and shear wave modes from the coupled, extrapolated wavefields. This helps to remove crosstalk artifacts.

One way to implement wave-mode separation is to compute the scalar and vector potential wavefields by applying divergence and curl operators. However, in practice, there are several difficulties when using this approach. First, the scalar and vector potential wavefields do not have the same phases, amplitudes, and physical units as the extrapolated wavefields. These differences can lead to inaccurate migration results. Second, the three components for PS images can be difficult to interpret. Third, the wavefield separation approach has a polarity reversal problem for PS image. As such, without proper corrections, summation of PS images over different sources yields nonconstructive stacking results.

Instead of using the divergence and curl operators, a vector wavefield decomposition approach can be employed by solving a linear equation system in the wavenumber domain. Wavefield decomposition is a technique that decomposes a wavefield into spatially orthogonal eigensolutions of the acoustic wave equation in a coordinate system that best suits the geometry of the aperture under consideration. This approach produces vector P- and S-wavefields that have the same phases, amplitudes, and units as the input elastic wavefields. An equivalent approach may also be implemented in the space domain, which requires solving a vector Poisson's equation. Despite using faster Poisson solvers, the computational cost is still expensive, especially for three dimensional (3D) problems. Another way to perform vector wavefield decomposition is to introduce an auxiliary P-wave equation. An S-wave can be obtained by subtracting P-wavefield from the coupled total wavefield. Although this strategy yields good separation results, solving an auxiliary P-wave equation also increases computational costs.

In view of the forgoing, the described system provides for an efficient and accurate vector wavefield decomposition with a corresponding modified dot-product imaging condition of ERTM by employing a modified AVO algorithm. In some implementations, the phases of source wavelet and multicomponent records are modified using a $1/\omega 2$ filter and the amplitudes of the extrapolated wavefields are scaled using $\alpha 2$ and $\beta 2$, where $\omega$, $\alpha$ and $\beta$ are the angular frequency, local P- and S-wave velocities, respectively. The results yield correct phases, amplitudes, and physical units for separated P- and S-mode wavefields. Divergence and curl operators may then be applied to the phase-corrected and amplitude-scaled elastic wavefields to extract vector P- and S-wavefields. With the separated vector wavefields, a modified dot-product imaging condition can be employed to produce PP and PS reflectivity images. For example, the dot-product imaging condition is modified by retaining its signs and recomputing its magnitudes using multiplication of the absolute values of separated source and receiver wavefields to produce relatively accurate angle-dependent amplitudes. Two dimensional (2D) numerical examples demonstrate the feasibility and robustness of the proposed method. In such implementations, this imaging condition retains the signs of dot-product but re-computes migration magnitudes using the multiplication of the absolute values of the separated source and receiver wavefields. This eliminates the effects of a cosine function $\cos \Delta\theta$, where $\Delta\theta$ is the difference of polarization angles between incident and reflected wavefields. This operation is equivalent to dividing dot-product imaging results by $\cos \Delta\theta$.

As an example, in 2D isotropic elastic media, the described system may employ linearized equation (Newton's second law) and equation of deformation (Hook's law):

$$\rho \frac{\partial v_x}{\partial t} = \frac{\partial \sigma_{zx}}{\partial z} + \frac{\partial \sigma_{xx}}{\partial x}, \quad (1)$$

$$\rho \frac{\partial v_z}{\partial t} = \frac{\partial \sigma_{zx}}{\partial x} + \frac{\partial \sigma_{zz}}{\partial z}, \quad (2)$$

$$\frac{\partial \sigma_{xx}}{\partial t} = (\lambda + 2\mu)\frac{\partial v_x}{\partial x} + \lambda \frac{\partial v_z}{\partial z}, \quad (3)$$

$$\frac{\partial \sigma_{zz}}{\partial t} = (\lambda + 2\mu)\frac{\partial v_z}{\partial z} + \lambda \frac{\partial v_x}{\partial x}, \quad (4)$$

$$\frac{\partial \sigma_{xz}}{\partial t} = \mu\left(\frac{\partial v_x}{\partial z} + \frac{\partial v_z}{\partial x}\right), \quad (5)$$

where $v_x$, $v_z$ are the particle velocity components in the x and z-direction of current propagation time t, respectively, $\rho$ is the density of the medium, $\lambda$ is the first Lame parameters and $\mu$ is the shear modules. $\sigma_{ij}$ denotes the ij th component of the symmetric stress tensor.

Plugging equations (3) (4) and (5) into equations (1) and (2) and take time derivate to both sides may be defined according to equations (6) and (7) respectively:

$$\rho \frac{\partial^2 v_x}{\partial t^2} = \frac{\partial (\lambda + 2\mu)\left(\frac{\partial v_x}{\partial x} + \frac{\partial v_z}{\partial z}\right)}{\partial x} + \frac{\partial \mu\left(\frac{\partial v_x}{\partial z} - \frac{\partial v_z}{\partial x}\right)}{\partial z} + 2\left(\frac{\partial \mu}{\partial z}\frac{\partial v_x}{\partial x} - \frac{\partial \mu}{\partial x}\frac{\partial v_z}{\partial z}\right), \text{ and} \quad (6)$$

$$\rho \frac{\partial^2 v_z}{\partial t^2} = \frac{\partial (\lambda + 2\mu)\left(\frac{\partial v_x}{\partial x} + \frac{\partial v_z}{\partial z}\right)}{\partial z} + \frac{\partial \mu\left(\frac{\partial v_z}{\partial x} - \frac{\partial v_x}{\partial z}\right)}{\partial x} + 2\left(\frac{\partial \mu}{\partial x}\frac{\partial v_z}{\partial z} - \frac{\partial \mu}{\partial z}\frac{\partial v_x}{\partial x}\right). \quad (7)$$

Given the extreme computational cost, equation (6) and (7) can be simplified by assuming a local constant shear modulus and result in the third terms dropped, which can be defined according to equations (8) and (9) respectively:

$$\rho \frac{\partial^2 v_x}{\partial t^2} = \frac{\partial (\lambda + 2\mu)\left(\frac{\partial v_x}{\partial x} + \frac{\partial v_z}{\partial z}\right)}{\partial x} + \frac{\partial \mu\left(\frac{\partial v_x}{\partial z} - \frac{\partial v_z}{\partial x}\right)}{\partial z}, \text{ and} \quad (8)$$

$$\rho \frac{\partial^2 v_z}{\partial t^2} = \frac{\partial (\lambda + 2\mu)\left(\frac{\partial v_x}{\partial x} + \frac{\partial v_z}{\partial z}\right)}{\partial z} + \frac{\partial \mu\left(\frac{\partial v_z}{\partial x} - \frac{\partial v_x}{\partial z}\right)}{\partial x}. \quad (9)$$

According to Helmholtz's theorem, which can be defined according to Equations (10) and (11), the summation of P and S particle velocities should be equal to the total particle velocities.

$$\frac{\partial^2 v_x}{\partial t^2} = \frac{\partial^2 v_x^p}{\partial t^2} + \frac{\partial^2 v_x^s}{\partial t^2}, \text{ and} \quad (10)$$

$$\frac{\partial^2 v_z}{\partial t^2} = \frac{\partial^2 v_z^p}{\partial t^2} + \frac{\partial^2 v_x^s}{\partial t^2}, \quad (11)$$

where $v_x^p$ and $v_z^p$ denote the particle velocities of P-wave in the x and z-direction, and the same notations applies for S-wave as well. Inserting equations (10) and (11) into equations (8) and (9), the divergence operator naturally remove S-wave from $v_x^p$ and $v_z^p$, and curl operator takes care of P-wave from $v_x^s$ and $v_z^s$.

The resultant equations can be rewritten in vector notations for brevity and defined according to equations (12) and (13) respectively:

$$\rho \frac{\partial^2 v^p}{\partial t^2} = \nabla\{(\lambda + 2\mu)\nabla \cdot v\}, \text{ and} \quad (12)$$

$$\rho \frac{\partial^2 v^s}{\partial t^2} = -\nabla \times \{\mu(\nabla \times v)\}. \quad (13)$$

Constant density and local P-wave ($\alpha$) and S-wave ($\beta$) velocities can be used to represent equations (12) and (13). These can be defined according to equations (14) and (15) respectively:

$$\frac{\partial^2 v^p}{\partial t^2} = \nabla\{\alpha^2 \nabla \cdot v\}, \text{ and} \quad (14)$$

$$\frac{\partial^2 v^s}{\partial t^2} = -\nabla \times \{\beta^2(\nabla \times v)\}. \quad (15)$$

The velocity wavefield v can be represented by Green's function g convolved with source wavelet s. Therefore, the angular frequency co can be approximated into the source term. For example, the equation (14) and (15) can be approximated as equations (16) and (17) respectively:

$$v^p = \nabla\left\{\alpha^2 \nabla \cdot \left(\frac{v}{\omega^2}\right)\right\}, \quad (16)$$

$$v^p = -\nabla \times \left\{\beta^2\left(\nabla \times -\frac{v}{\omega^2}\right)\right\}. \quad (17)$$

The input source wavelet and multi-component records can be filtered by $1/\omega^2$ correspondingly. To avoid division by small frequencies in practice, the filtering in the time domain can be implemented using a double integral with respect to time for both source and receiver inputs.

A dot-product imaging condition for vector-based elastic RTM may be employ to avoid the polarity reversal problem for PS images that occurs in traditional elastic RTM. However, this imaging condition involves multiplication by a cosine function cos $\Delta\theta$, where $\Delta\theta$ denotes the difference of polarization angles between the incident and reflected wavefields. This may lead to an inaccurate estimation of reflection coefficients. To eliminate the amplitude effects of the cosine function, the dot-product imaging results can be normalized with the absolute value of cos $\Delta\theta$. However, when multiple waves intersect in the areas with complicated structures, accurately estimate propagation and polarity direction is difficult to obtain. To simplify the angle-dependent normalization, the signs of dot-product and recompute migration magnitudes can be retained using the multiplication of the absolute values of separated source and receiver wavefields. The result is a modified dot-product imaging condition as, which can be defined according to equations (18)

$$I^{PP}(x) = \frac{\sum_{x_s} \int_0^T \text{sgn}^{PP}(x_s, x, t)|u_s^P(x_s, x, t)||u_r^P(x_s, x, t)|dt}{\sum_{x_s} \int_0^T |u_s^P(x_s, x, t)|^2 dt}, \text{ and} \quad (18)$$

$$I^{PS}(x) = \frac{\sum_{x_s} \int_0^T \text{sgn}^{PS}(x_s, x, t)|u_s^P(x_s, x, t)||u_r^S(x_s, x, t)|dt}{\sum_{x_s} \int_0^T |u_s^P(x_s, x, t)|^2 dt},$$

where $I^{PP}$ and $I^{PS}$ are the images for PP and PS reflectivities, $x_s$ and x are the source and image point locations, u is the separated vector wavefield, subscripts s and r denote the source and receiver sides, superscripts P and S denote P- and S-modes, |•| is the absolute value, and T is the record duration, sgn PP and sgn PS are the signs for PP and PS images, respectively.

In a first example, a Marmousi model is employed to demonstrate the adaptability of the described system for complicated structures. A Marmousi model is complex 2D structural model that may be used to compare depth-migration and velocity determination models. Such model often involve horizontal and vertical velocity changes.

Figure 1B:
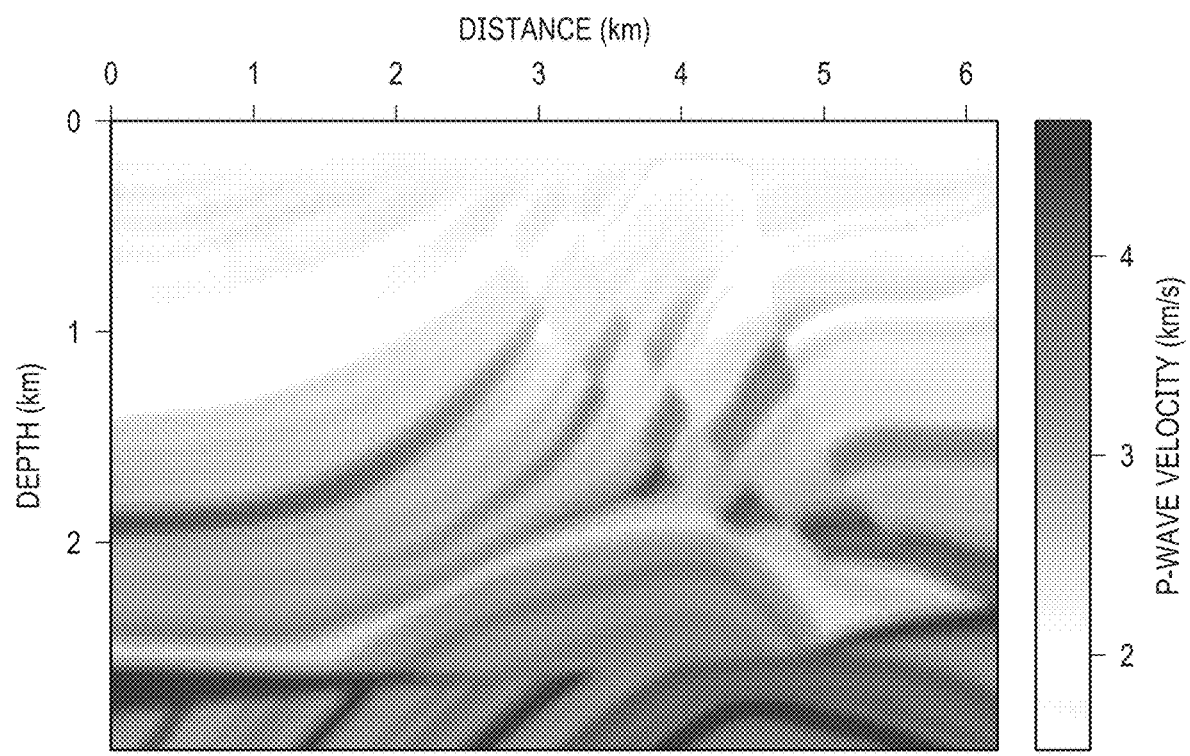
Figure 1C:
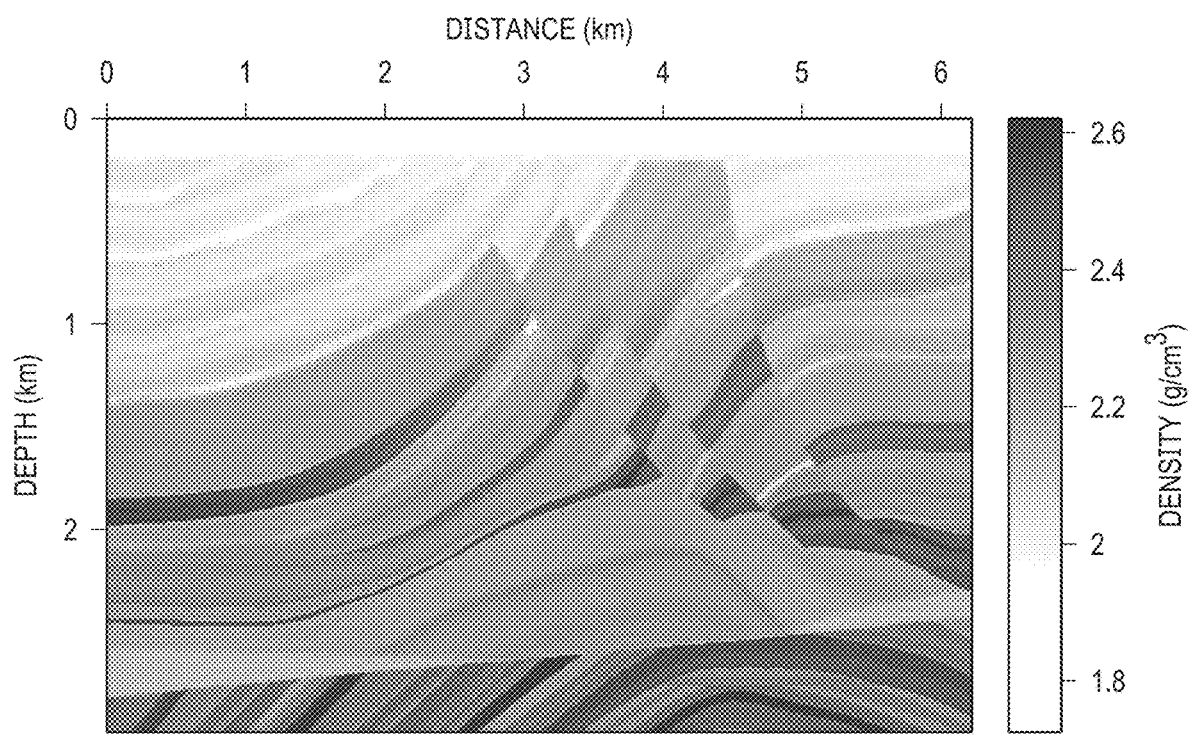
Figure 1D:
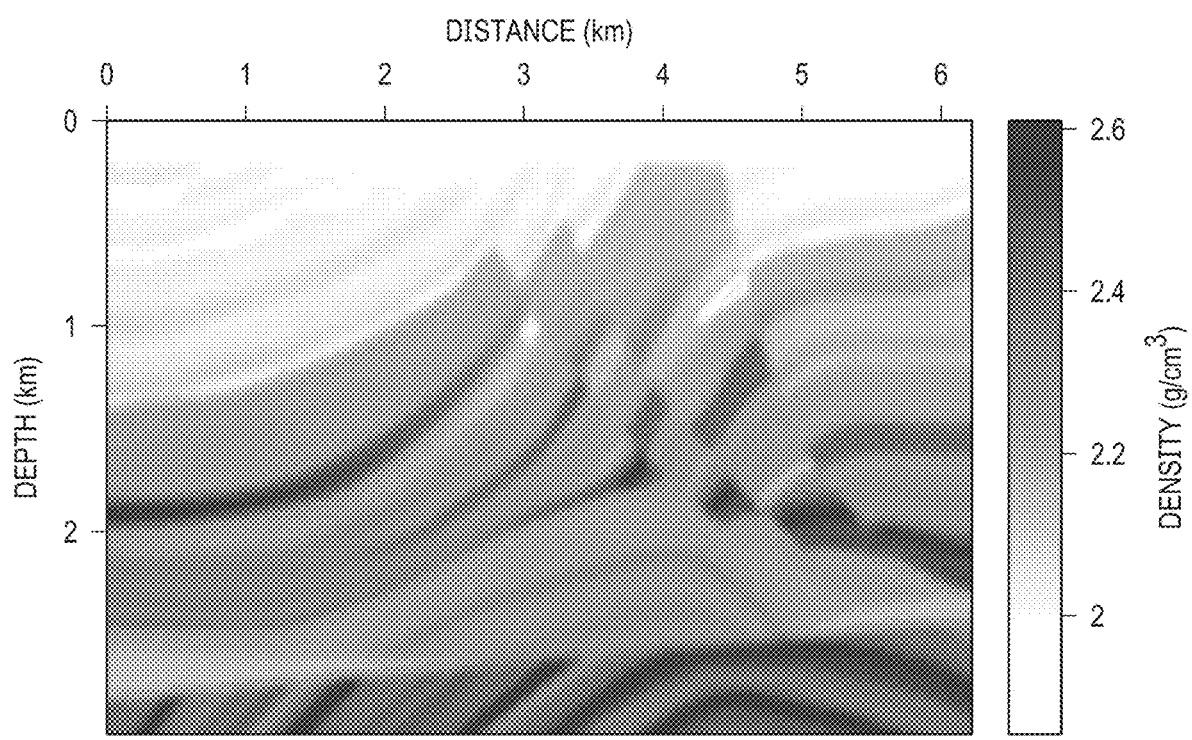

FIGS. 1A-1B depict the results of the ERTM experiment for the first example Marmousi model. FIGS. 1A and 1B depict the true and smoothed P-wave velocity models respectively. FIGS. 1C and 1D depict the true and smoothed density models. S-wave velocities respectively that are constructed by scaling P-wave velocities divided by 1.7. The smoothed models are computed by applying a triangle filter with radius of 62.5 m×62.5 m.

P-wave velocity and density models are depicted in FIGS. 1A and 1C. An S-wave velocity model can be constructed by scaling P-wave velocity with a factor of √3. Migration velocities (depicted in FIG. 1B) and density (depicted in FIG. 1D) may be built by smoothing the true models with a triangle filter of 62.5 meter (m)×62.5 m. 322 seismic sources are evenly deployed on the surface with equal spacing such as a 37.5 m spacing. For each shot, a Ricker explosive source with peak frequency of 20 Hertz (Hz) is located in the middle with a 2500 m aperture. 400 receivers are used to cover the aperture with a spacing of 6.25 m. Time sampling is 0.5 millisecond (ms) and record duration is 4 s.

Figure 2A:
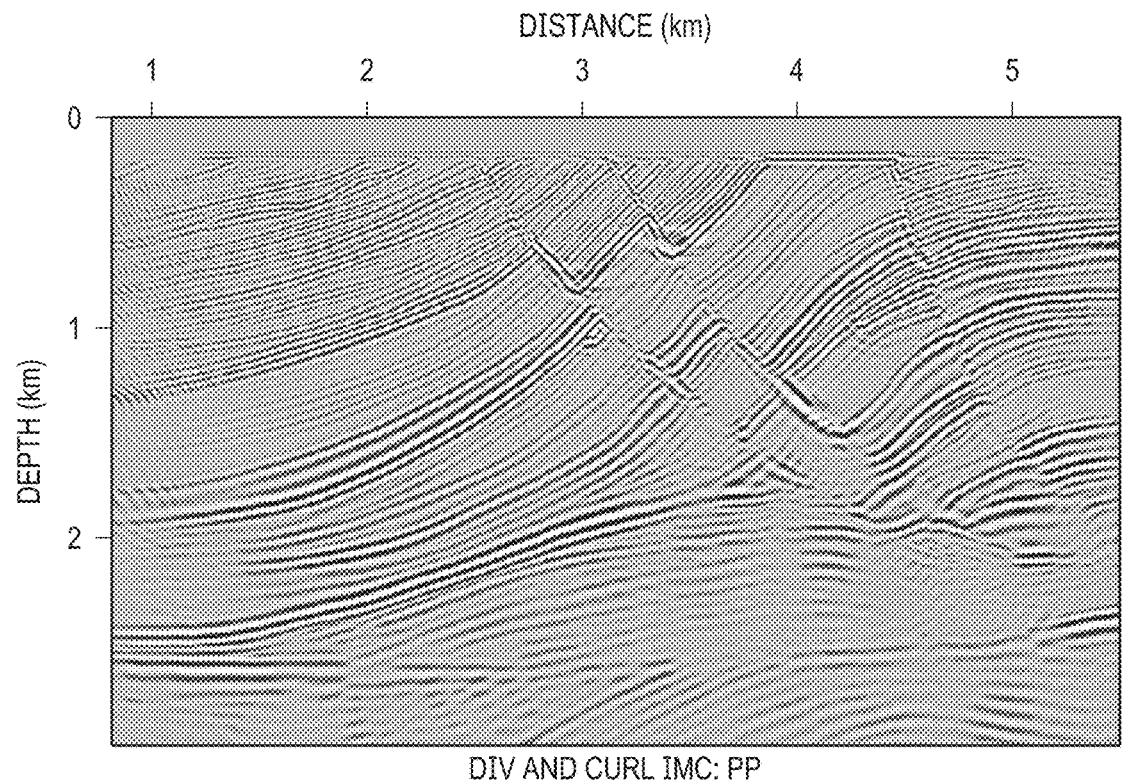
FIGS. 2A-2F depicts PP and PS images for the example Marmousi model migrated using different elastic schemes.
Figure 2B:
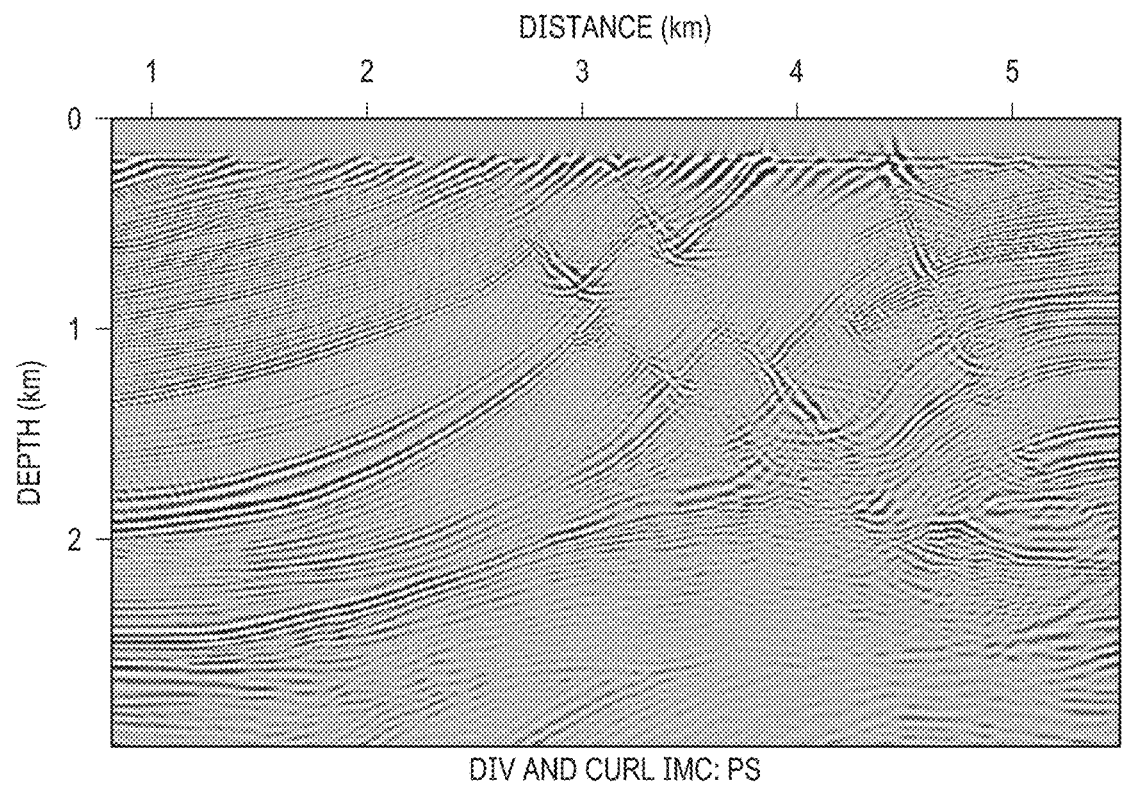
Figure 2C:
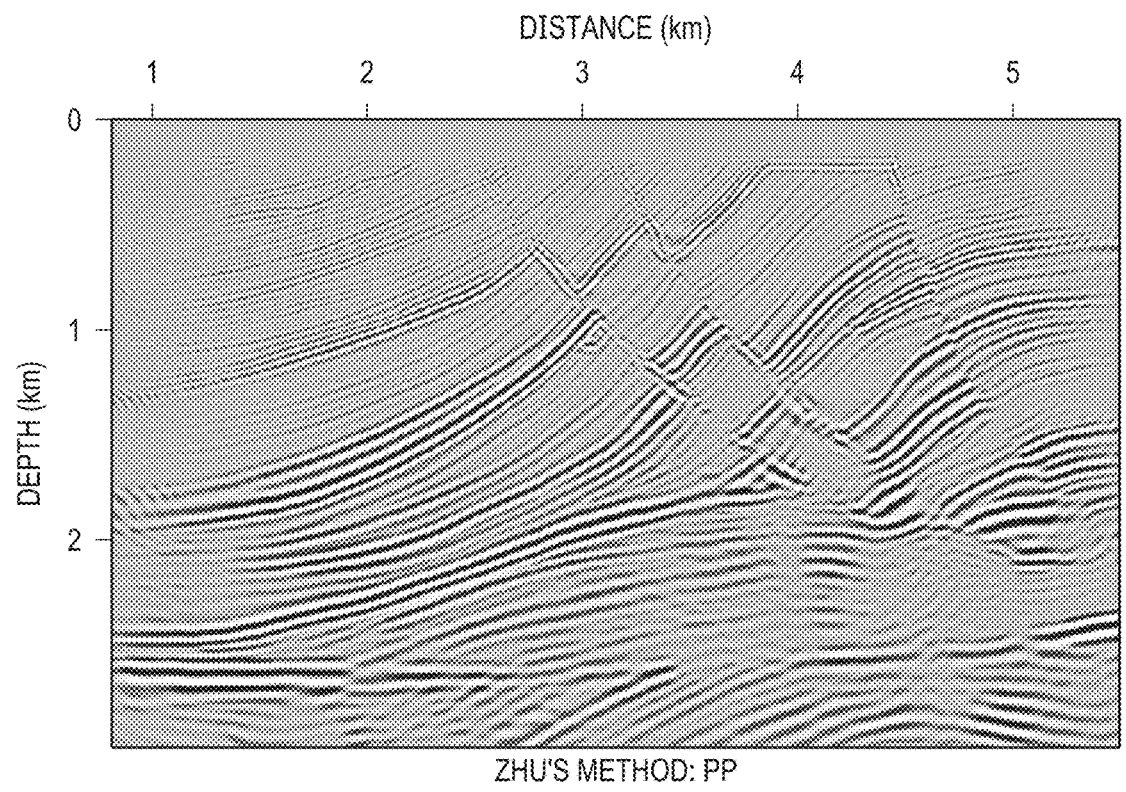
Figure 2D:
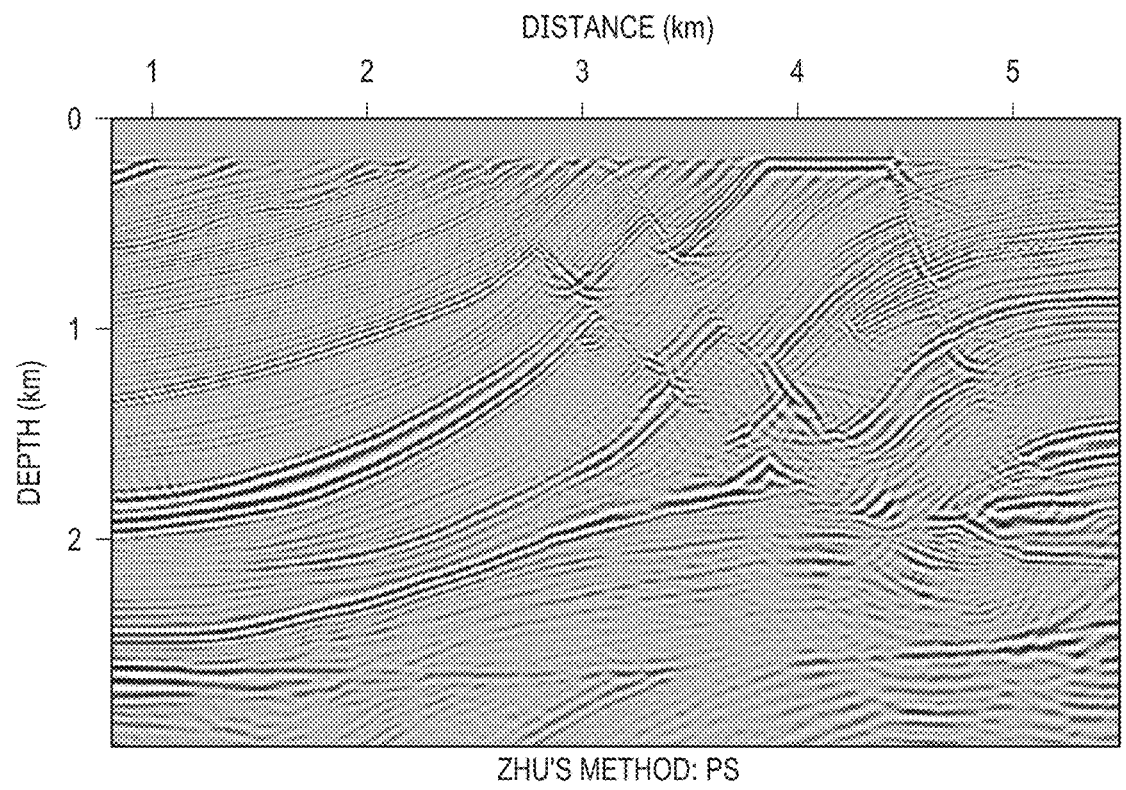
Figure 2E:
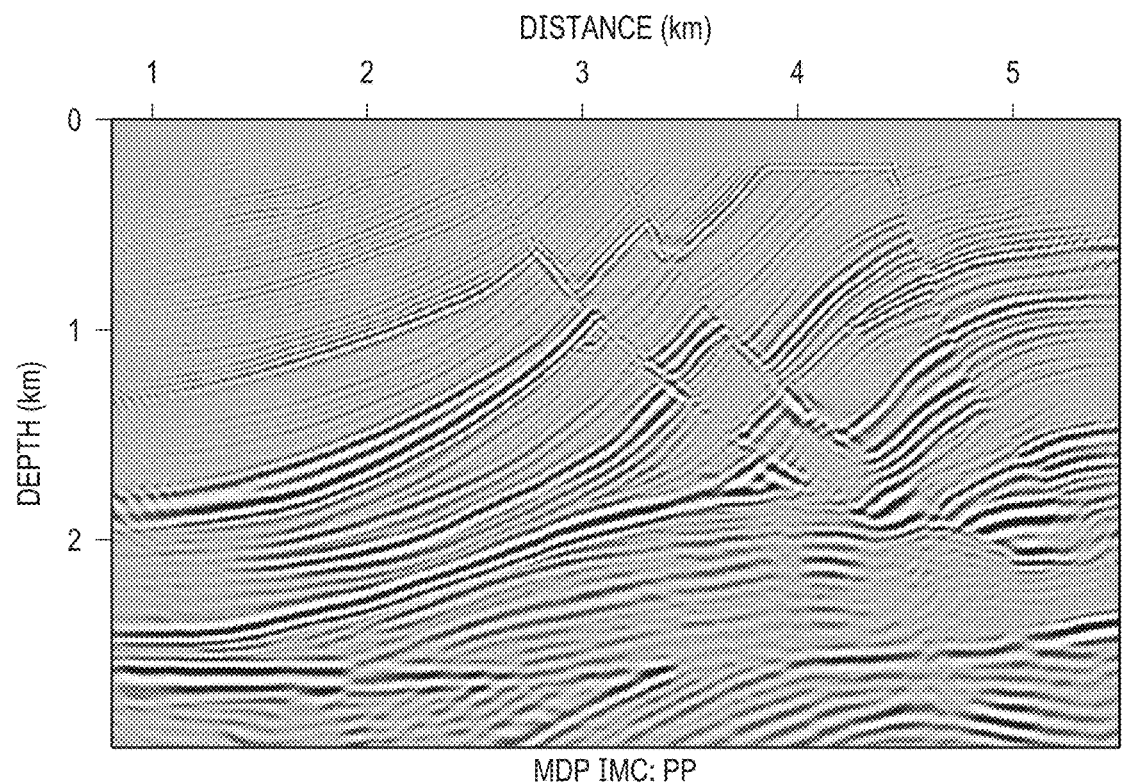
Figure 2F:
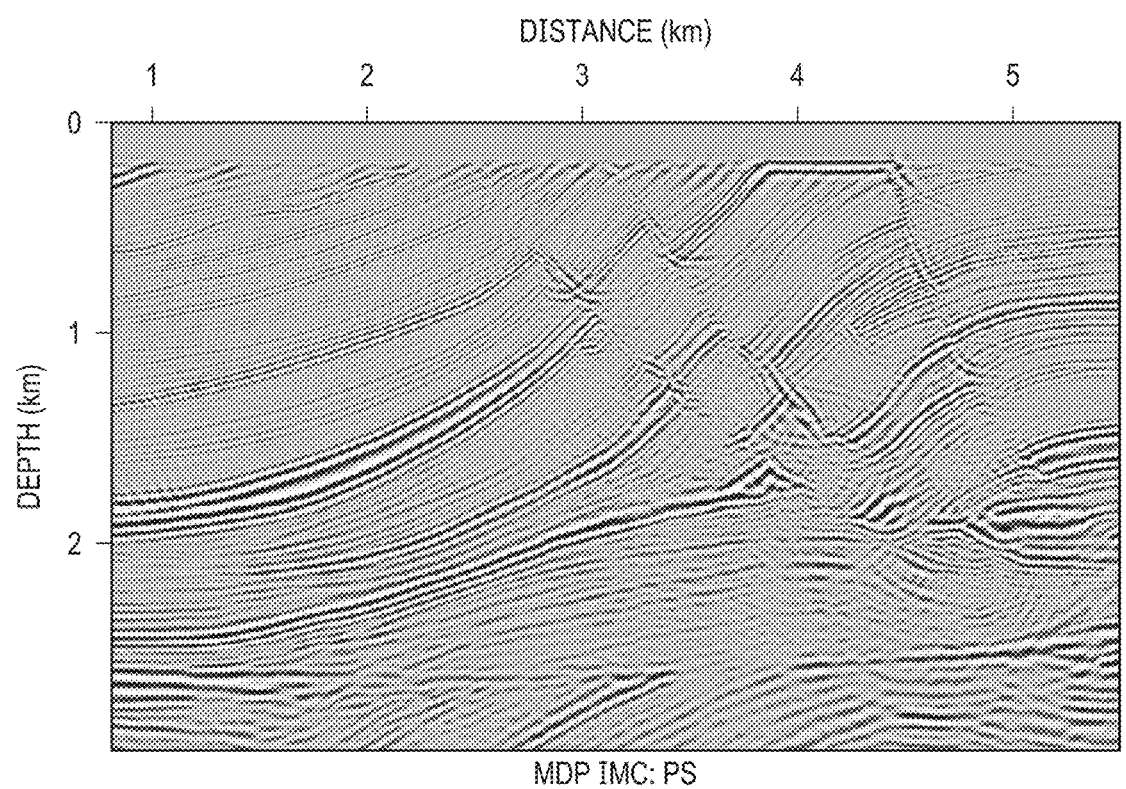

FIGS. 2A-2F depicts PP and PS images for the first example Marmousi model migrated using different elastic schemes. FIGS. 2A and 2B are from a method where no polarity correction is applied for PS image. FIGS. 2C and 2D are computed using elastic wavefield separation based on the Helmholtz decomposition (Zhu method). FIGS. 2E and 2F migrated using the described system.

Figure 3A:
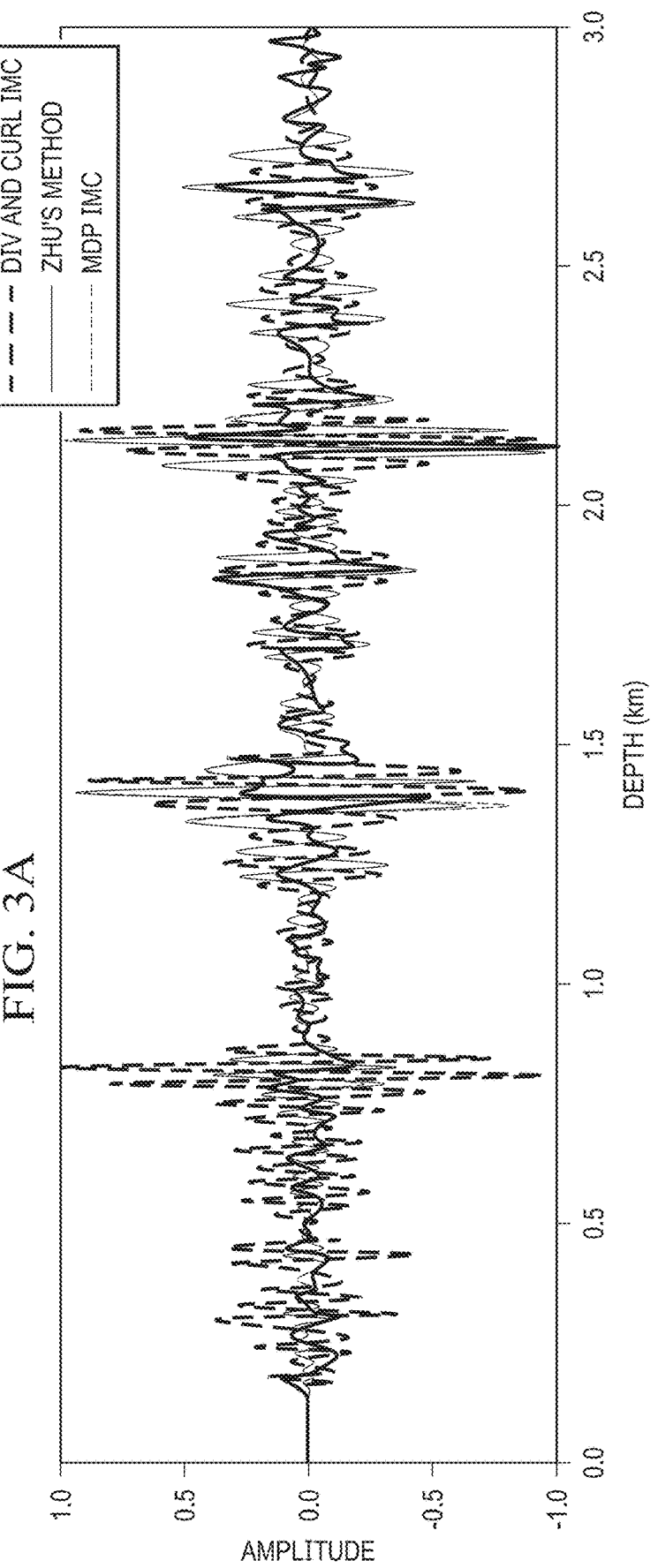
FIGS. 3A and 3B depict a comparison of PP and PS reflectivities respectively.
Figure 3B:
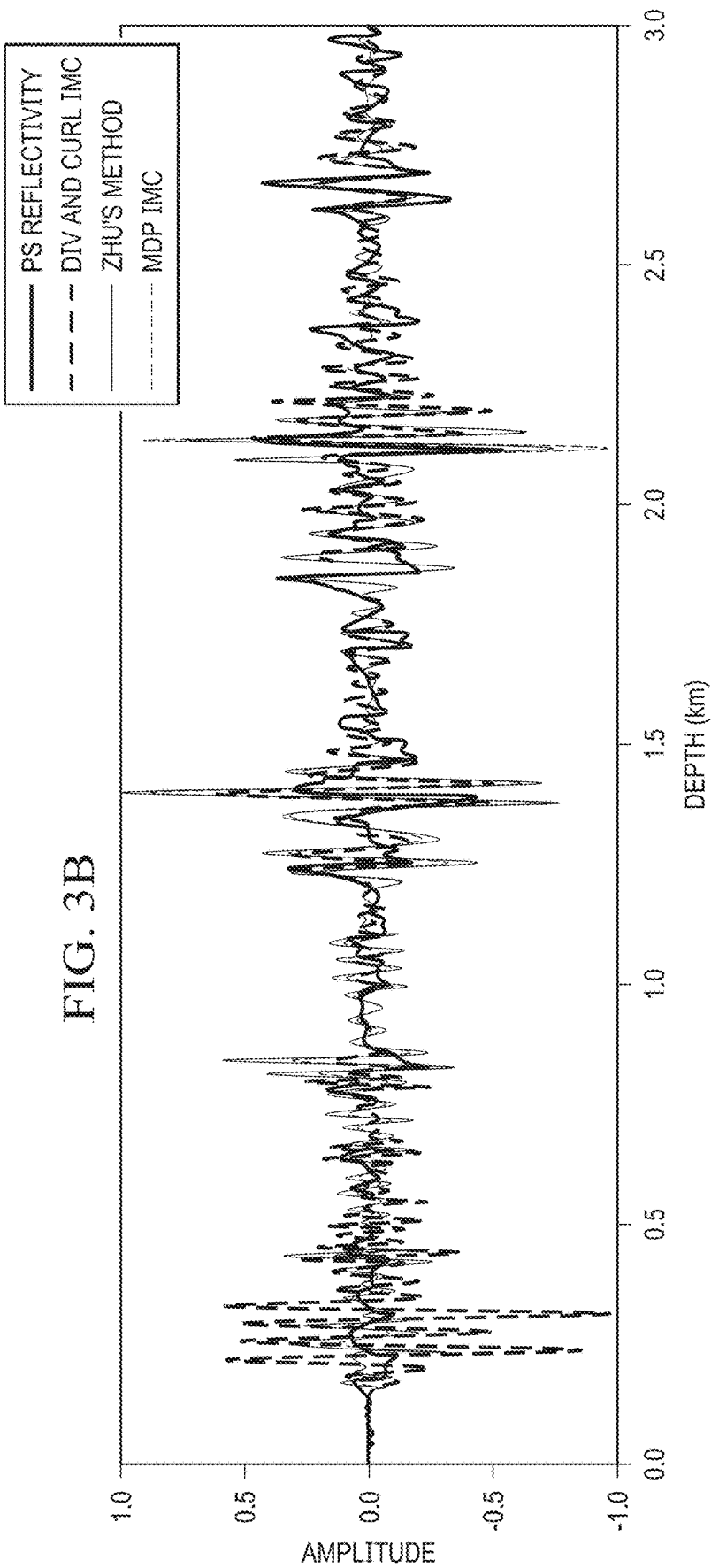

FIGS. 3A and 3B depict a comparison of PP and PS reflectivities, respectively, at distance of 2.0 kilometers (km). The PP and PS reflectivities are illustrated as solid lines. The PP reflectivity line denotes the true reflectivity. The Div. and Curl Inverse Monte Carlo (IMC) are from the method where no polarity correction is applied for PS image. The Markov Decision Process (MDP) IMC, which is the imaging condition of the Zhu method, is from the images of the described system. The amplitudes are normalized with respect to their maximum values. The true reflectivities are computed with R=(ρv−ρ0v0)/(ρv0), where v and v0 are true and smoothed P- or S-wave velocities, ρ and ρ0 are the true and smoothed densities. The PP images from all these three methods have good resolutions for the complicated faults and deep anticlines. But the image from isotropic angle-domain elastic reverse-time migration method has phase shifts in comparison with the true PP reflectivity. The amplitude is also over-estimated at shallow zones, such as from 0 to 1.0 km in depth (see green line in FIG. 3a). This is because the divergence and curl operators produce incorrect phases and amplitudes during wavefields decomposition. In contrast, the Zhu method and the described system are accurate in terms of both phases and amplitudes (see red and blue lines FIG. 2A). For PS images, FIG. 2B shows obvious nonconstructive stacking effects caused by the polarity reversal problem. Using wavefields decomposition in equation 8 and modified dot-product imaging condition, the proposed method avoids the polarity reversal issue and produces clear PS image (FIG. 2F). In addition, due to the removal of the cos Δθ effect, the PS-image amplitudes fit the true reflectivities better than that from the Zhu method (see FIG. 3B from 0.2 to 1.0 km).

In a second example, a simple two-layer model is employed. The model include a horizontal reflector that is located at a depth of 1.6 km. α=2500 meters per second (m/s), β=1443 m/s and ρ=2.0 grams per centimeter cubed (g/cm3) for the upper; α=3000 m/s, β=1732 m/s and ρ=2.1 g/cm3 for the bottom layer. This model is discretize with a grid of 601×401 and a spatial spacing of 8 m. An explosive source of Ricker wavelet with peak frequency of 15 Hz was deployed at the location indicated. FIGS. 4A-D and 5A-D show the PP and PS images using different elastic RTM schemes. The images using displacement crosscorrelation imaging condition (DC IMC) resolve the reflector with hybrid PP and PS energies (see FIGS. 4A and 5A). These results have no clear physical meaning and are hard to interpret. In addition, without considering wavefield decomposition, this approach also produces strong crosstalk artifacts. Using divergence and curl operators, the approach of the isotropic angle-domain elastic reverse-time migration method (referred to Div & Curl IMC) reduces the crosstalks and produces clear PP and PS images (see FIGS. 4B and 5B). But divergence and curl operations change the migrated phases and there are polarity reversal problems for PS image (see FIG. 4B). By applying Helmholtz decomposition and dot-product imaging condition, the Zhu method produces correct phases and avoids the annoying polarity reversal problem. However, the migrated PP and PS amplitudes are inaccurate due to the introduction of a cosine function and hence cannot be interpreted as the reflection coefficients, especially at large offsets (see Dot-Product line in FIGS. 6A and 6B). The described ERTM workflow produces correct phases as the Zhu method yields more accurate migrated amplitudes within the effective reflection angles (see modified dot-product lines in FIGS. 6A and 6B).

Figure 4A:
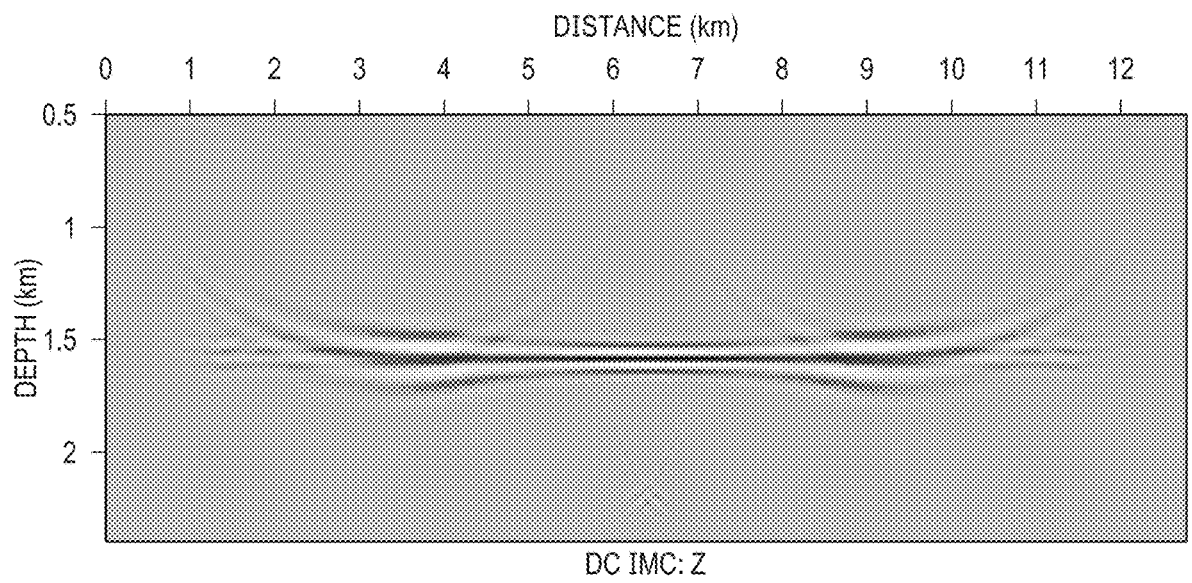
FIG. 4A-4D depicts Z-component images of the PP data (PP/Z-component images) for the two-layer model using different Rapid Radiative Transfer Model (RRTM) schemes.
Figure 4B:
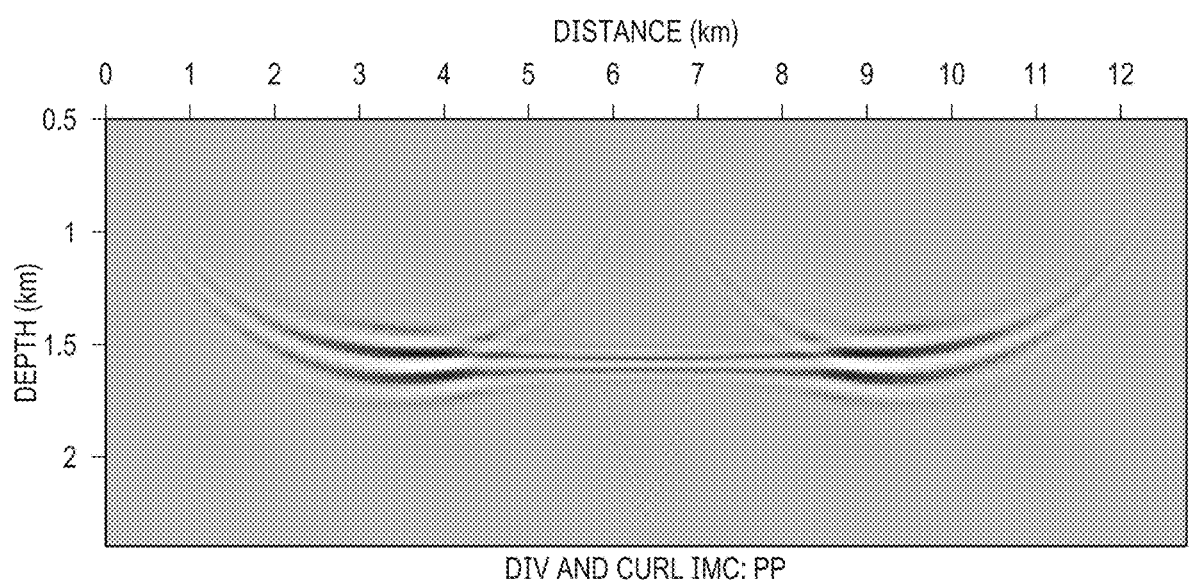
Figure 4C:
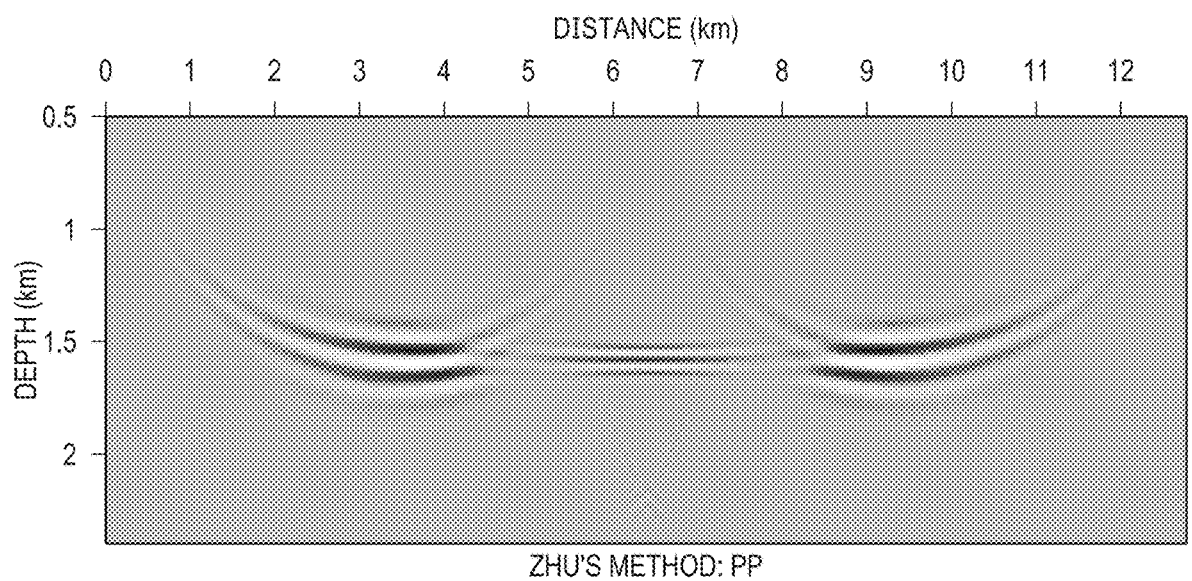
Figure 4D:
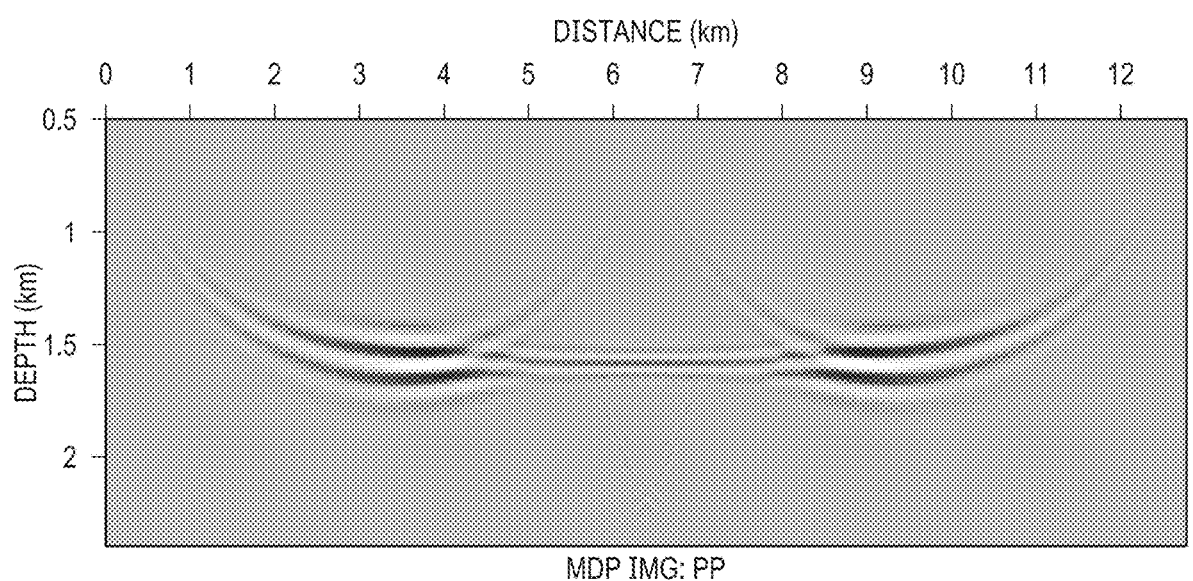
Figure 5A:
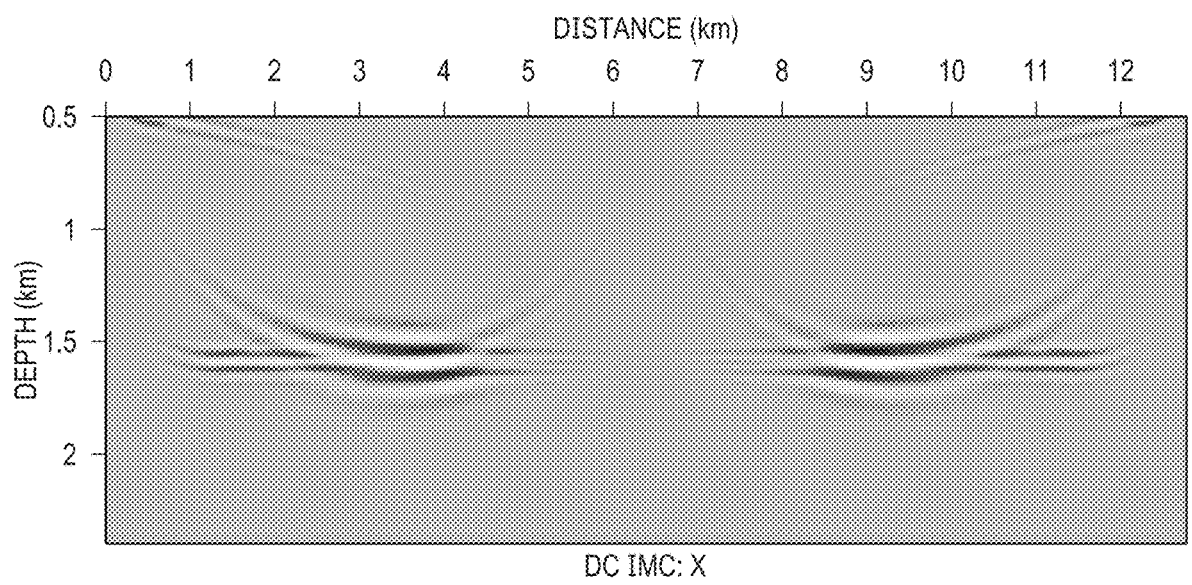
FIG. 5A-5D depict the PP/Z-component images for the two-layer model using different elastic reverse-time imaging or migration (RTM) schemes.
Figure 5B:
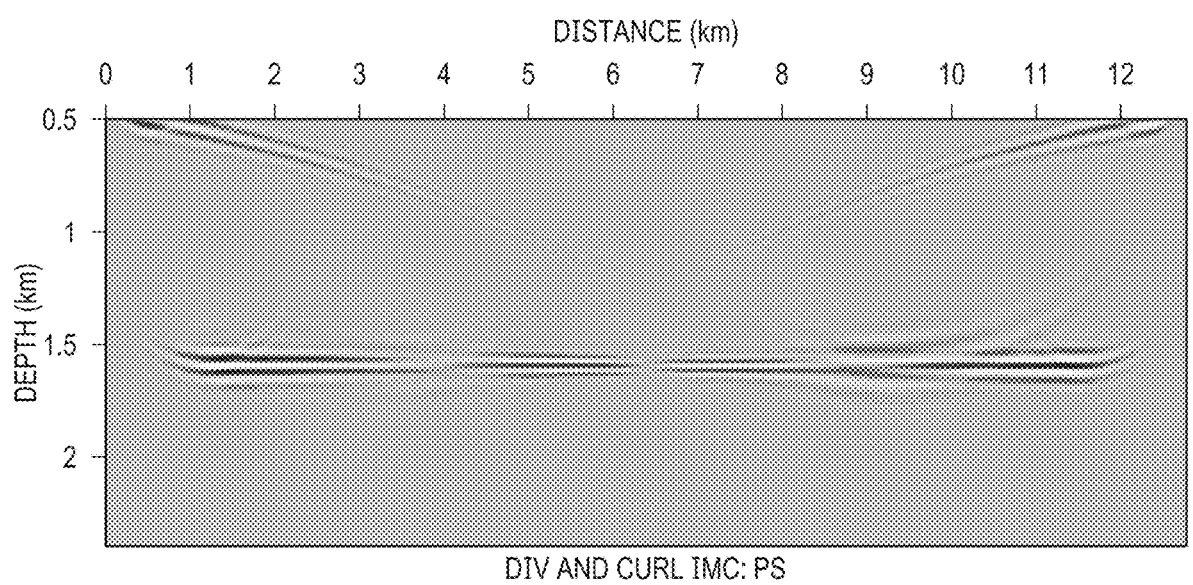
Figure 5C:
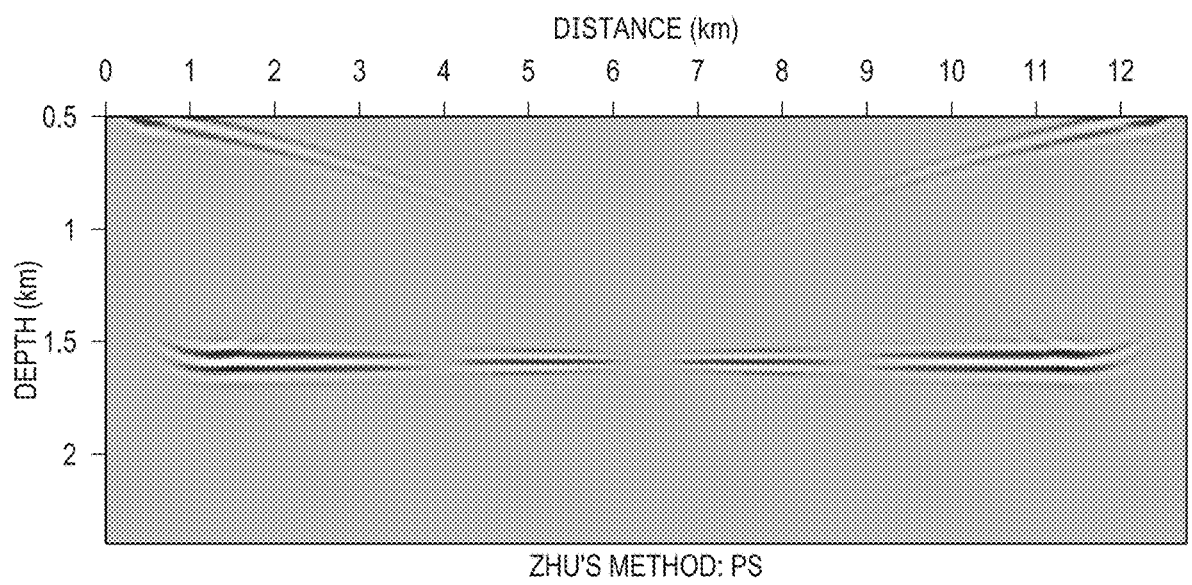
Figure 5D:
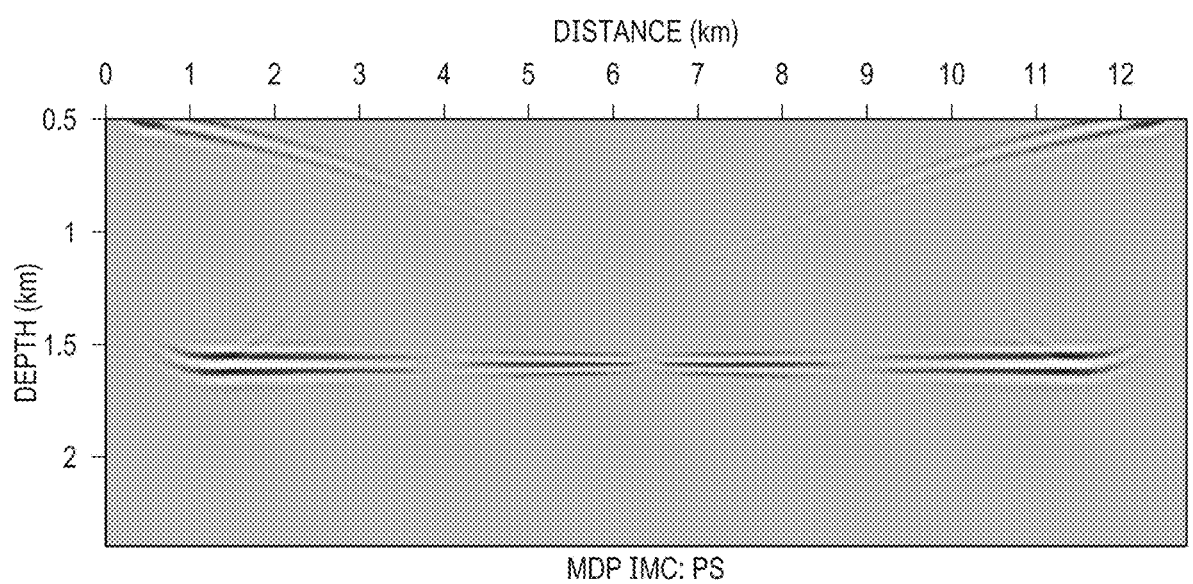

FIGS. 4A-4D depicts PP/Z-component images for the two-layer model (the second example) using different RRTM schemes. FIG. 4A depicts the DC IMC: scheme. FIG. 4B depicts the Div & Curl IMC: PP scheme. FIG. 4C depicts Zhu's PP scheme. FIG. 4D depict MDP IMC PP scheme. DC IMC denotes displacement cross-correlation imaging condition. Div & Curl IMC denotes the isotropic angle-domain elastic reverse-time migration method performs wavefield decomposition using divergence and curl operators, and applies a scalar and vector potential imaging condition. The Zhu method first performs wavefields decomposition based on solving the Poisson equation and then applies a dot-product imaging condition. MDP IMC denotes the described ERTM system, which uses a modified dot-product imaging condition.

FIGS. 5A-5D depict the PP/Z-component images for the two-layer model using different elastic RTM schemes.

FIGS. 1A and 6B depict a comparisons of the PP (a) and PS (b) reflection coefficients between the analytic solutions and the peak amplitudes of ERTM images in FIGS. 4 and 5. The analytical PS coefficient ling is calculated by solving Zoeppritz equation. The modified dot-product line and the dot product line are the image peak values at reflector using the dot-product and modified do-product imaging conditions, respectively. Due to the insufficient illumination, both dot-product and modified dot-product imaging condition produce inaccurate migration amplitudes at offsets above a specified threshold.

Figure 7:
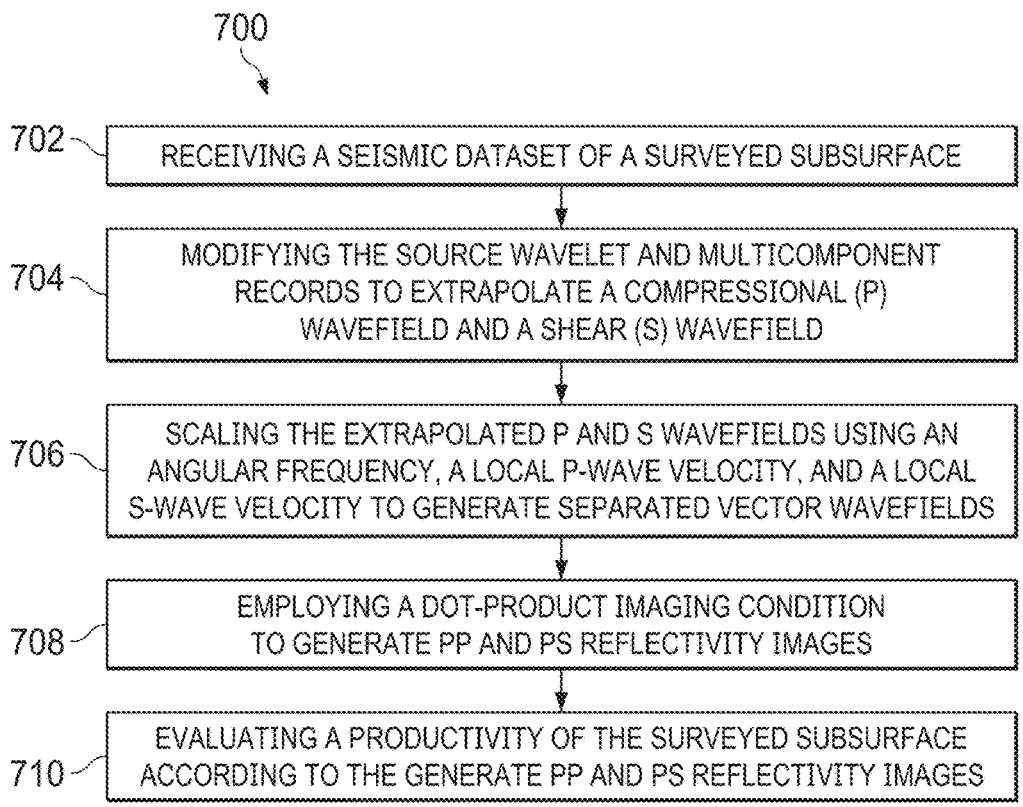
FIG. 7 depicts a flow diagram of an example vector wavefield decomposition process 700 employed to conduct seismic surveys.

FIG. 7 depicts a flow diagram of an example vector wavefield decomposition process 700 employed to conduct seismic surveys. For clarity of presentation, the description that follows generally describes method 700 in the context of FIGS. 1A-6B and 8. However, it will be understood that method 700 may be performed, for example, by any other suitable system, environment, software, and hardware, or a combination of systems, environments, software, and hardware. In some implementations, various steps of method 700 can be run in parallel, in combination, in loops, or in any order.

At 702, a seismic data set of a surveyed subsurface is received. In some instances, the seismic dataset includes source wavelet and multicomponent records. Next, at step 704, the source wavelet and multicomponent records are modified to extrapolate a compressional (P) wavefield and a shear (S) wavefield. The extrapolated P and S wavefields are scaled, at step 706, using an angular frequency, a local P-wave velocity, and a local S-wave velocity to generate separated vector wavefields. At step 708, a dot-product imaging condition is employed to generate PP and PS reflectivity images. In some instances, the dot-product imaging condition is modified by retaining its signs and recomputing its magnitudes using multiplication of the absolute values of the separated vector wavefields. Next, at step 710, productivity of the surveyed subsurface is evaluated according to the generate PP and PS reflectivity images.

Figure 8:
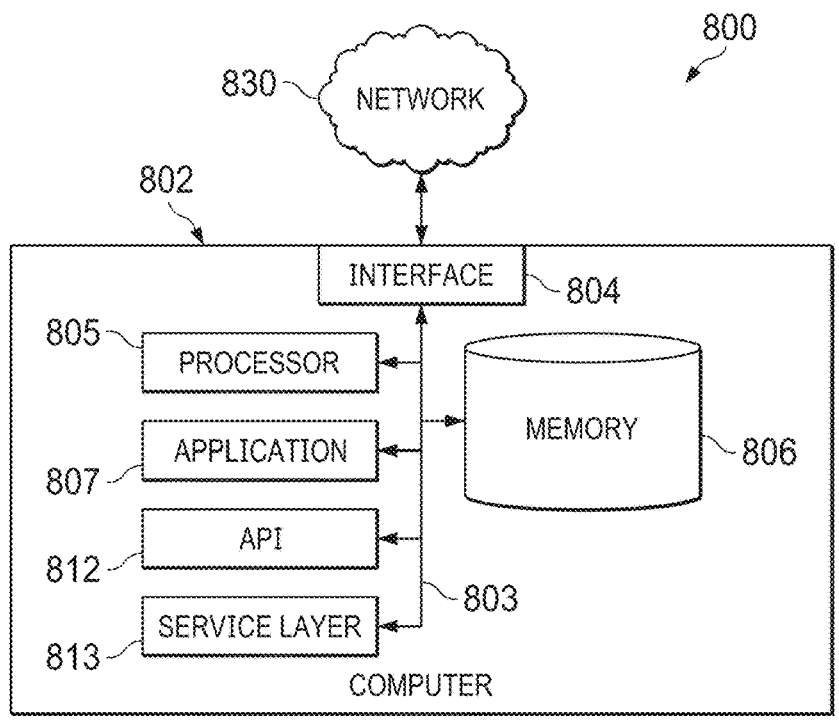
FIG. 8 depicts a block diagram of an example computer system used to provide computational functionalities associated with described algorithms, methods, functions, processes, flows, and procedures as described in the instant disclosure, according to an implementation.

FIG. 8 depicts a block diagram of an example computer system 800 used to provide computational functionalities associated with described algorithms, methods, functions, processes, flows, and procedures as described in the instant disclosure, according to an implementation. The illustrated computer 802 is intended to encompass any computing device such as a server, desktop computer, laptop or notebook computer, wireless data port, smart phone, personal data assistant (PDA), tablet computing device, or one or more processors within these devices, including both physical or virtual instances (or both) of the computing device. Additionally, the computer 802 may comprise a computer that includes an input device, such as a keypad, keyboard, touch screen, or other device that can accept user information, and an output device that conveys information associated with the operation of the computer 802, including digital data, visual, or audio information (or a combination of information), or a GUI.

The computer 802 can serve in a role as a client, network component, a server, a database or other persistency, or any other component (or a combination of roles) of a computer system for performing the subject matter described in the instant disclosure. The illustrated computer 802 is communicably coupled with a network 830. In some implementations, one or more components of the computer 802 may be configured to operate within environments, including cloud-computing-based, local, global, or a combination of environments.

At a high level, the computer 802 is an electronic computing device operable to receive, transmit, process, store, or manage data and information associated with the described subject matter. According to some implementations, the computer 802 may also include or be communicably coupled with an application server, e-mail server, web server, caching server, streaming data server, business intelligence (BI) server, or other server (or a combination of servers).

The computer 802 can receive requests over network 830 from a client application (for example, executing on another computer 802) and responding to the received requests by processing the said requests in a software application. In addition, requests may also be sent to the computer 802 from internal users (for example, from a command console or by other access method), external or third parties, other automated applications, as well as any other entities, individuals, systems, or computers.

Each of the components of the computer 802 can communicate using a system bus 803. In some implementations, any or all of the components of the computer 802, both hardware or software (or a combination of hardware and software), may interface with each other or the interface 804 (or a combination of both) over the system bus 803 using an application programming interface (API) 812 or a service layer 813 (or a combination of the API 812 and service layer 813). The API 812 may include specifications for routines, data structures, and object classes. The API 812 may be either computer-language independent or dependent and refer to a complete interface, a single function, or even a set of APIs. The service layer 813 provides software services to the computer 802 or other components (whether or not illustrated) that are communicably coupled to the computer 802. The functionality of the computer 802 may be accessible for all service consumers using this service layer. Software services, such as those provided by the service layer 813, provide reusable, defined business functionalities through a defined interface. For example, the interface may be software written in JAVA, C++, or other suitable language providing data in extensible markup language (XML) format or other suitable format. While illustrated as an integrated component of the computer 802, alternative implementations may illustrate the API 812 or the service layer 813 as stand-alone components in relation to other components of the computer 802 or other components (whether or not illustrated) that are communicably coupled to the computer 802. Moreover, any or all parts of the API 812 or the service layer 813 may be implemented as child or sub-modules of another software module, enterprise application, or hardware module without departing from the scope of this disclosure.

The computer 802 includes an interface 804. Although illustrated as a single interface 804 in FIG. 8, two or more interfaces 804 may be used according to particular needs, desires, or particular implementations of the computer 802. The interface 804 is used by the computer 802 for communicating with other systems in a distributed environment that are connected to the network 830 (whether illustrated or not). Generally, the interface 804 comprises logic encoded in software or hardware (or a combination of software and hardware) and operable to communicate with the network 830. More specifically, the interface 804 may comprise software supporting one or more communication protocols associated with communications such that the network 830 or interface's hardware is operable to communicate physical signals within and outside of the illustrated computer 802.

The computer 802 includes a processor 805. Although illustrated as a single processor 805 in FIG. 8, two or more processors may be used according to particular needs, desires, or particular implementations of the computer 802. Generally, the processor 805 executes instructions and manipulates data to perform the operations of the computer 802 and any algorithms, methods, functions, processes, flows, and procedures as described in the instant disclosure.

The computer 802 also includes a memory 806 that holds data for the computer 802 or other components (or a combination of both) that can be connected to the network 830 (whether illustrated or not). For example, memory 806 can be a database storing data consistent with this disclosure. Although illustrated as a single memory 806 in FIG. 8, two or more memories may be used according to particular needs, desires, or particular implementations of the computer 802 and the described functionality. While memory 806 is illustrated as an integral component of the computer 802, in alternative implementations, memory 806 can be external to the computer 802.

The application 807 is an algorithmic software engine providing functionality according to particular needs, desires, or particular implementations of the computer 802, particularly with respect to functionality described in this disclosure. For example, application 807 can serve as one or more components, modules, or applications. Further, although illustrated as a single application 807, the application 807 may be implemented as multiple applications 807 on the computer 802. In addition, although illustrated as integral to the computer 802, in alternative implementations, the application 807 can be external to the computer 802.

There may be any number of computers 802 associated with, or external to, a computer system containing computer 802, each computer 802 communicating over network 830. Further, the term "client," "user," and other terminology may be used interchangeably as without departing from the scope of this disclosure. Moreover, this disclosure contemplates that many users may use one computer 802, or that one user may use multiple computers 802.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data. Such devices can include, for example, a programmable processor, a computer, or multiple processors or computers. The apparatus can also be or further include special purpose logic circuitry, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, or libraries. Conversely, the features and functionality of various components can be combined into single components.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and compact disc read-only memory (CD-ROM), Digital Versatile Disc (DVD)+/−R, DVD-RAM, and DVD-ROM disks. The memory may store various objects or data, including caches, classes, frameworks, applications, backup data, jobs, web pages, web page templates, database tables, repositories storing dynamic information, and any other information including any parameters, variables, algorithms, instructions, rules, constraints, or references. Additionally, the memory may include any other data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad, by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term graphical user interface (GUI) may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an API or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of the described system or on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described earlier as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed.

Moreover, the separation or integration of various system modules and components in the implementations described earlier should not be understood as requiring such separation or integration in all implementations, and it should be understood that the described program components and systems can generally be integrated together in a single software product or packaged into multiple software products.

Accordingly, the earlier description of example implementations does not define or constrain this disclosure. Other changes, substitutions, and alterations are also possible without departing from the spirit and scope of this disclosure.

Furthermore, any claimed implementation described later is considered to be applicable to at least a computer-implemented method, a non-transitory, computer-readable medium storing computer-readable instructions to perform the computer-implemented method, and a computer system comprising a computer memory interoperably coupled with a hardware processor configured to perform the computer-implemented method or the instructions stored on the non-transitory, computer-readable medium.

What is claimed is:

1. A computer-implemented method for amplitude variations with offset (AVO) of imaging condition in elastic reverse time migration (ERTM) executed by one or more processors, the method comprising:
   receiving a seismic dataset of a surveyed subsurface, the seismic dataset comprising source wavelet and multi-component records;
   modifying the source wavelet and multicomponent records to extrapolate a compressional (P) wavefield and a shear (S) wavefield;
   scaling the extrapolated P and S wavefields using an angular frequency, a local P-wave velocity, and a local S-wave velocity to generate separated vector wavefields;
   employing a dot-product imaging condition to generate PP and PS reflectivity images, wherein the dot-product imaging condition is modified by retaining its signs and recomputing its magnitudes using multiplication of the absolute values of the separated vector wavefields; and
   evaluating a productivity of the surveyed subsurface according to the generate PP and PS reflectivity images.

2. The computer-implemented method of claim 1, wherein modifying the source wavelet and multicomponent records includes modifying phases of the source wavelet and multicomponent records using a $$\frac{1}{\omega^2}$$

filter.

3. The computer-implemented method of claim 1, wherein scaling the extrapolated P and S wavefields includes scaling amplitudes of the extrapolated P and S wavefields using the angular frequency, the local P-wave velocity, and the local S-wave velocity to generate separated vector wavefields.

4. The computer-implemented method of claim 1, wherein the dot-product imaging condition generate PP and PS reflectivity images with substantially accurate angle-dependent amplitudes.

5. The computer-implemented method of claim 1, wherein the dot-product imaging conditions use the equations:

$$I^{PP}(x) = \frac{\sum_{x_s} \int_0^T \text{sgn}^{PP}(x_s, x, t)|u_s^P(x_s, x, t)||u_r^P(x_s, x, t)|dt}{\sum_{x_s} \int_0^T |u_s^P(x_s, x, t)|^2 dt},$$

$$I^{PS}(x) = \frac{\sum_{x_s} \int_0^T \text{sgn}^{PS}(x_s, x, t)|u_s^P(x_s, x, t)||u_r^S(x_s, x, t)|dt}{\sum_{x_s} \int_0^T |u_s^P(x_s, x, t)|^2 dt},$$

where $I^{PP}$ are $I^{PS}$ are images for PP and PS reflectivities, $x_s$ and x are source and image point locations, u is the separated vector wavefield, subscripts s and r denote source and receiver sides, superscripts P and S denote P- and S-modes, |•| is an absolute value, and T is a record duration, sgn PP and sgn PS are signs for PP and PS images.

6. One or more non-transitory computer-readable storage media coupled to one or more processors and having instructions stored thereon which, when executed by the one or more processors, cause the one or more processors to:
   receive a seismic dataset of a surveyed subsurface, the seismic dataset comprising source wavelet and multi-component records;
   modify the source wavelet and multicomponent records to extrapolate a compressional (P) wavefield and a shear (S) wavefield;
   scale the extrapolated P and S wavefields using an angular frequency, a local P-wave velocity, and a local S-wave velocity to generate separated vector wavefields;
   employ a dot-product imaging condition to generate PP and PS reflectivity images, wherein the dot-product imaging condition is modified by retaining its signs and recomputing its magnitudes using multiplication of the absolute values of the separated vector wavefields; and
   evaluate a productivity of the surveyed subsurface according to the generate PP and PS reflectivity images.

7. The computer-readable storage media of claim 6, wherein modify the source wavelet and multicomponent records includes modify phases of the source wavelet and multicomponent records using a $$\frac{1}{\omega^2}$$

filter.

8. The computer-readable storage media of claim 6, wherein scale the extrapolated P and S wavefields includes scale amplitudes of the extrapolated P and S wavefields using the angular frequency, the local P-wave velocity, and the local S-wave velocity to generate separated vector wavefields.

9. The computer-readable storage media of claim 6, wherein the dot-product imaging condition generate PP and PS reflectivity images with substantially accurate angle-dependent amplitudes.

10. The computer-readable storage media of claim 6, wherein the dot-product imaging conditions use the equations:

$$I^{PP}(x) = \frac{\sum_{x_s} \int_0^T \text{sgn}^{PP}(x_s, x, t)|u_s^P(x_s, x, t)||u_r^P(x_s, x, t)|dt}{\sum_{x_s} \int_0^T |u_s^P(x_s, x, t)|^2 dt},$$

$$I^{PS}(x) = \frac{\sum_{x_s} \int_0^T \text{sgn}^{PS}(x_s, x, t)|u_s^P(x_s, x, t)||u_r^S(x_s, x, t)|dt}{\sum_{x_s} \int_0^T |u_s^P(x_s, x, t)|^2 dt},$$

where $I^{PP}$ are $I^{PS}$ are images for PP and PS reflectivities, xs and x are source and image point locations, u is the separated vector wavefield, subscripts s and r denote source and receiver sides, superscripts P and S denote P- and S-modes, |•| is an absolute value, and T is a record duration, sgn PP and sgn PS are signs for PP and PS images.

11. A system, comprising:
one or more processors; and
a computer-readable storage device coupled to the one or more processors and having instructions stored thereon which, when executed by the one or more processors, cause the one or more processors to:
  receive a seismic dataset of a surveyed subsurface, the seismic dataset comprising source wavelet and multicomponent records;
  modify the source wavelet and multicomponent records to extrapolate a compressional (P) wavefield and a shear (S) wavefield;
  scale the extrapolated P and S wavefields using an angular frequency, a local P-wave velocity, and a local S-wave velocity to generate separated vector wavefields;
  employ a dot-product imaging condition to generate PP and PS reflectivity images, wherein the dot-product imaging condition is modified by retaining its signs and recomputing its magnitudes using multiplication of the absolute values of the separated vector wavefields; and
  evaluate a productivity of the surveyed subsurface according to the generate PP and PS reflectivity images.

12. The system of claim 11, wherein modify the source wavelet and multicomponent records includes modify phases of the source wavelet and multicomponent records using a $$\frac{1}{\omega^2}$$

filter.

13. The system of claim 11, wherein scale the extrapolated P and S wavefields includes scale amplitudes of the extrapolated P and S wavefields using the angular frequency, the local P-wave velocity, and the local S-wave velocity to generate separated vector wavefields.

14. The system of claim 11, wherein the dot-product imaging condition generate PP and PS reflectivity images with substantially accurate angle-dependent amplitudes.

15. The system of claim 11, wherein the dot-product imaging conditions use the equations:

$$I^{PP}(x) = \frac{\sum_{x_s} \int_0^T \text{sgn}^{PP}(x_s, x, t)|u_s^P(x_s, x, t)||u_r^P(x_s, x, t)|dt}{\sum_{x_s} \int_0^T |u_s^P(x_s, x, t)|^2 dt},$$

$$I^{PS}(x) = \frac{\sum_{x_s} \int_0^T \text{sgn}^{PS}(x_s, x, t)|u_s^P(x_s, x, t)||u_r^S(x_s, x, t)|dt}{\sum_{x_s} \int_0^T |u_s^P(x_s, x, t)|^2 dt},$$

where $I^{PP}$ are $I^{PS}$ are images for PP and PS reflectivities, xs and x are source and image point locations, u is the separated vector wavefield, subscripts s and r denote source and receiver sides, superscripts P and S denote P- and S-modes, |•| is an absolute value, and T is a record duration, sgn PP and sgn PS are signs for PP and PS images.

* * * * *

UNITED STATES PATENT AND TRADEMARK OFFICE
CERTIFICATE OF CORRECTION

PATENT NO. : 11,086,036 B2
APPLICATION NO. : 16/254227
DATED : August 10, 2021
INVENTOR(S) : Zhao et al.

Page 1 of 1

It is certified that error appears in the above-identified patent and that said Letters Patent is hereby corrected as shown below:

In the Claims

Column 16, Line 28, Claim 5, delete "where $I^{PP}$ are $I^{PS}$ are images" and insert -- where $I^{PP}$ and $I^{PS}$ are images --;

Column 17, Line 24, Claim 10, delete "where $I^{PP}$ are $I^{PS}$ are images" and insert -- where $I^{PP}$ and $I^{PS}$ are images --;

Column 18, Line 40 (approx.), Claim 15, delete "where $I^{PP}$ are $I^{PS}$ are images" and insert -- where $I^{PP}$ and $I^{PS}$ are images --.

Signed and Sealed this
Fifth Day of April, 2022

Drew Hirshfeld
*Performing the Functions and Duties of the
Under Secretary of Commerce for Intellectual Property and
Director of the United States Patent and Trademark Office*